(12) United States Patent
Enomoto et al.

(10) Patent No.: US 10,516,984 B2
(45) Date of Patent: Dec. 24, 2019

(54) TERMINAL DEVICE, BASE STATION DEVICE, AND CONTROL DEVICE

(71) Applicant: SHARP KABUSHIKI KAISHA, Osaka-shi, Osaka (JP)

(72) Inventors: Masayuki Enomoto, Osaka (JP); Masafumi Aramoto, Osaka (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 14/780,267

(22) PCT Filed: Mar. 17, 2014

(86) PCT No.: PCT/JP2014/057147
§ 371 (c)(1),
(2) Date: Sep. 25, 2015

(87) PCT Pub. No.: WO2014/156769
PCT Pub. Date: Oct. 2, 2014

(65) Prior Publication Data
US 2016/0044485 A1    Feb. 11, 2016

(30) Foreign Application Priority Data

Mar. 26, 2013   (JP) ................................. 2013-064838

(51) Int. Cl.
*H04W 48/16*    (2009.01)
*H04W 8/00*    (2009.01)
(Continued)

(52) U.S. Cl.
CPC ........... *H04W 8/005* (2013.01); *H04W 76/14* (2018.02); *H04W 84/12* (2013.01); *H04W 92/18* (2013.01)

(58) Field of Classification Search
CPC combination set(s) only.
See application file for complete search history.

(56) References Cited

U.S. PATENT DOCUMENTS

2006/0242664 A1 * 10/2006 Kikkawa ............ H04N 21/4627
                                                                725/37
2009/0042576 A1 *  2/2009 Mukherjee ........... H04J 11/0093
                                                                455/436
(Continued)

FOREIGN PATENT DOCUMENTS

WO    WO 2012/097075 A2    7/2012
WO    WO 2013/165834 A1    11/2013

OTHER PUBLICATIONS

3GPP TR22.803 Technical Specification Group Services and System Aspects, Feasibility study for Proximity Services (ProSe)(Release 12) Mar. 2013.

(Continued)

*Primary Examiner* — Cindy Trandai
(74) *Attorney, Agent, or Firm* — Birch, Stewart, Kolasch & Birch, LLP

(57) ABSTRACT

In a proximity service, when positional information is notifies to a server in advance and the proximity service is started, UE that transmits and receives data receives the proximity degree including a communication target UE from the server before proximity discovery is performed to discover the communication target UE, and the UE controls unnecessary proximity discovery by discovering the communication target UE based on the proximity degree.

4 Claims, 22 Drawing Sheets

(51) Int. Cl.
*H04W 76/14* (2018.01)
*H04W 84/12* (2009.01)
*H04W 92/18* (2009.01)

(56) References Cited

U.S. PATENT DOCUMENTS

| | | | |
|---|---|---|---|
| 2009/0088169 A1* | 4/2009 | Aaron | H04W 76/025 455/445 |
| 2011/0082939 A1* | 4/2011 | Montemurro | H04W 76/023 709/227 |
| 2011/0258313 A1* | 10/2011 | Mallik | H04W 8/005 709/224 |
| 2011/0294474 A1* | 12/2011 | Barany | H04W 8/005 455/414.1 |
| 2012/0163235 A1* | 6/2012 | Ho | H04L 67/1061 370/254 |
| 2012/0179789 A1 | 7/2012 | Griot et al. | |
| 2013/0016629 A1* | 1/2013 | Mallik | H04W 8/005 370/255 |
| 2013/0109301 A1* | 5/2013 | Hakola | H04W 76/14 455/39 |
| 2013/0242866 A1* | 9/2013 | Lin | H04B 7/26 370/328 |
| 2013/0288608 A1 | 10/2013 | Fwu et al. | |
| 2013/0347073 A1* | 12/2013 | Bryksa | H04L 63/105 726/4 |
| 2014/0006483 A1* | 1/2014 | Garmark | H04L 67/42 709/203 |
| 2014/0094212 A1* | 4/2014 | Ahn | H04W 4/70 455/517 |
| 2014/0219194 A1* | 8/2014 | Varoglu | H04W 76/043 370/329 |
| 2014/0227997 A1* | 8/2014 | Kim | H04W 76/14 455/410 |
| 2015/0296551 A1* | 10/2015 | Kim | H04W 76/14 455/426.1 |

OTHER PUBLICATIONS

3GPP TS23.401 Technical Specification Group Services and System Aspects, General Packet Radio Service (GPRS) enhancements for Evolved Universal Terrestrial Radio Access Network (E-UTRAN) access. (Release 11) Mar. 2013.

3GPP TS 22.278 v12.2.0 (Mar. 2013) 3rd Generation Partnership Project; Technical Specification Group Services and System Aspects; Service requirements for the Evolved Packet System (EPS) (Release 12), Mar. 2013.

European Search Report for Application No. 14776541.6 dated Sep. 7, 2016.

Qualcomm Incorporated: "Proposed solution for direct discovery and communication using E-UTRAN", SA WG2 Meeting #95, Prague, S2-130308, Czech Republic, Jan. 28-Feb. 1, 2013.

* cited by examiner

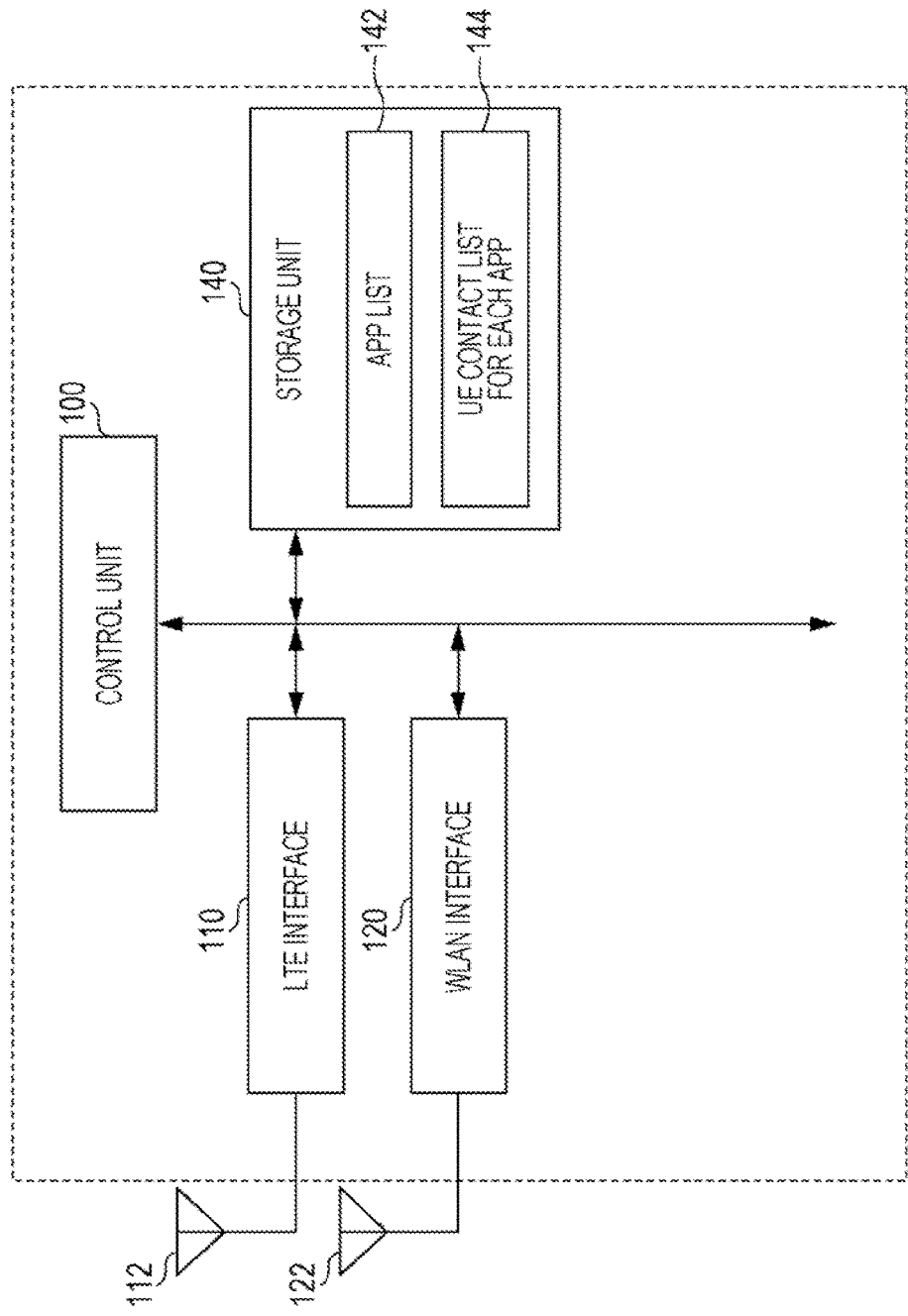

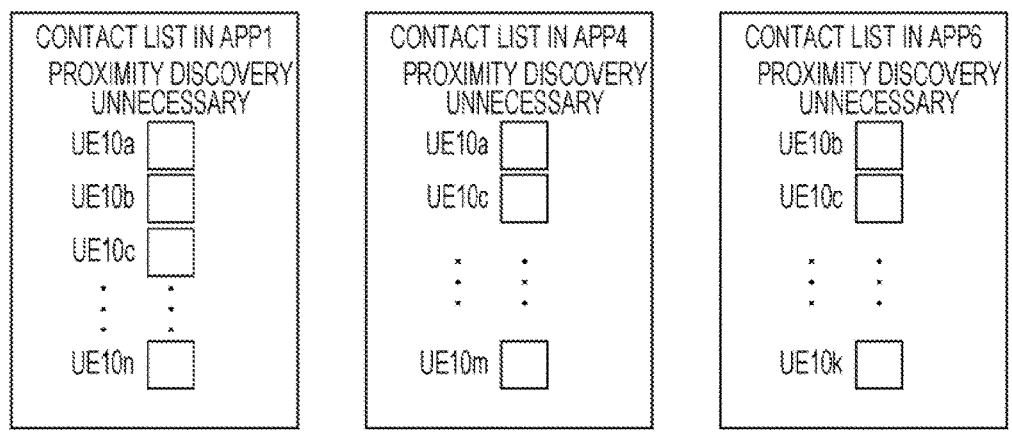

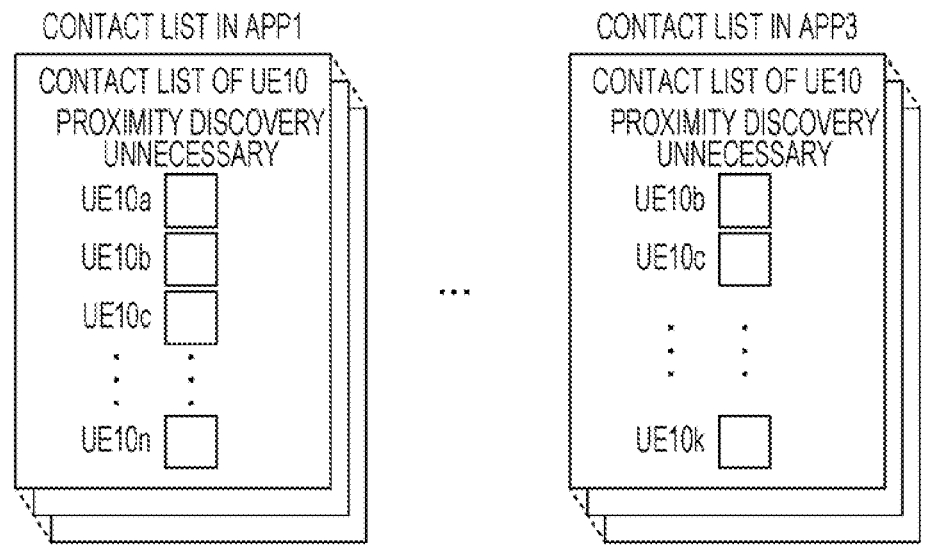

FIG. 7A

| UE IDENTIFIER | POSITION IDENTIFIER |
|---|---|
| UE10 | POSITION A |
|  | POSITION a |
| UE10a | POSITION A |
|  | POSITION b |
| UE10b | POSITION B |
| UE10c | POSITION C |
| ⋮ | ⋮ |
| UE10zz | POSITION x |

FIG. 7B

| DETERMINATION METHOD | DETERMINATION RESULT |
|---|---|
| CASE WHERE UEs ARE LOCATED IN THE SAME AP NAME | WLAN(D) |
| CASE WHERE UEs ARE LOCATED IN THE SAME SSID | WLAN(D) |
| CASE WHERE UEs ARE LOCATED IN THE SAME Realm | WLAN(D) |
| CASE WHERE UEs ARE LOCATED IN THE SAME eNB | LTE(D) |
| THERE IS NOT ANY CORRESPONDENCE CASE | none |

FIG. 16A
PROXIMITY EVALUATION RESULTS IN APP1

| CONTACT LIST OF UE10 | USABLE COMMUNICATION PATH |
|---|---|
| UE10a | LTE(D) |
| UE10b | LTE(D) |
| ⋮ | ⋮ |
| UEn | none |

FIG. 16B
PROXIMITY EVALUATION RESULTS IN APP2

| CONTACT LIST OF UE10 | USABLE COMMUNICATION PATH |
|---|---|
| UE10a | WLAN(D) |
| ⋮ | ⋮ |
| UEm | none |

FIG. 16C
PROXIMITY EVALUATION RESULTS IN APP3

| CONTACT LIST OF UE10 | USABLE COMMUNICATION PATH |
|---|---|
| UE10a | LTE(D), WLAN(D) |
| UE10b | LTE(D) |
| UE10c | WLAN(D) |
| ⋮ | ⋮ |
| UEk | none |

FIG. 19
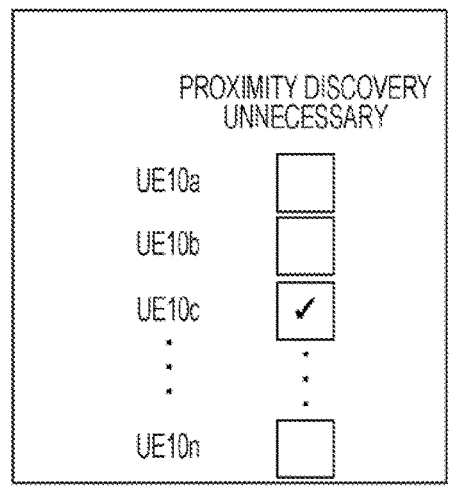
FIG. 20
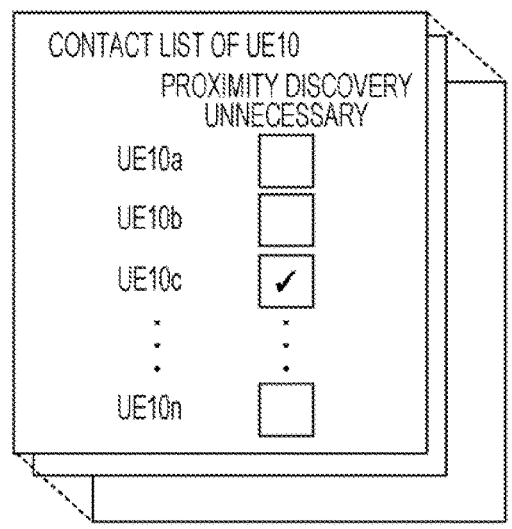
FIG. 21A
| ON/OFF OF LTE(D) | ON |
|---|---|
FIG. 21B
| ON/OFF OF WLAN(D) | ON |
|---|---|

FIG. 22

| CONTACT LIST IN APP1 | | | |
|---|---|---|---|
| CONTACT LIST OF UE10 | PROXIMITY DISCOVERY UNNECESSARY | LTE(D) | WLAN(D) |
| UE10a | ☐ | ON | ON |
| UE10b | ☐ | ON | OFF |
| UE10c | ✓ | ON | OFF |
| ⋮ | ⋮ | ⋮ | ⋮ |
| UE10n | ☐ | ON | OFF |

FIG. 23

CASE WHERE UE10b TRANSMITS OFF OF LTE(D)

BEFORE UPDATE

CONTACT LIST IN APP1

| CONTACT LIST OF UE10 | PROXIMITY DISCOVERY UNNECESSARY | LTE(D) | WLAN(D) |
|---|---|---|---|
| UE10a | ☐ | ON | ON |
| UE10b | ☐ | ON | OFF |
| UE10c | ✓ | ON | OFF |
| ⋮ | ⋮ | ⋮ | ⋮ |
| UE10n | ☐ | ON | OFF |

↓

AFTER UPDATE

CONTACT LIST IN APP1

| CONTACT LIST OF UE10 | PROXIMITY DISCOVERY UNNECESSARY | LTE(D) | WLAN(D) |
|---|---|---|---|
| UE10a | ☐ | ON | ON |
| UE10b | ☐ | OFF | OFF |
| UE10c | ✓ | ON | OFF |
| ⋮ | ⋮ | ⋮ | ⋮ |
| UE10n | ☐ | ON | OFF |

FIG. 24

| UE ACTION POLICY | WLAN(D) IS PERFORMED IN CASE OF PROXIMITY DEGREES OF 1 TO 3, LTE(D) IS PERFORMED IN CASE OF PROXIMITY DEGREE OF 4, AND DIRECT COMMUNICATION IS NOT AVAILABLE IN CASE OF PROXIMITY DEGREE OF 5 |
|---|---|

FIG. 25

| CONTENT OF POLICY | DEGREE OF PROXIMITY |
|---|---|
| CASE WHERE UEs ARE LOCATED IN THE SAME AP NAME | 1 |
| CASE WHERE UEs ARE LOCATED IN THE SAME SSID | 2 |
| CASE WHERE UEs ARE LOCATED IN THE SAME Realm | 3 |
| CASE WHERE UEs ARE LOCATED IN THE SAME eNB | 4 |
| THERE IS NOT ANY CORRESPONDENCE CASE | 5 |

FIG. 26

| CONTACT LIST OF UE10 | DEGREE OF PROXIMITY |
|---|---|
| UE10a | 1 |
|  | 4 |
| UE10b | 4 |
| * | * |
| * | * |
| * | * |
| UEzz | 5 |

TERMINAL DEVICE, BASE STATION DEVICE, AND CONTROL DEVICE

TECHNICAL FIELD

The present invention relates to a mobile communication system that includes a terminal device, a base station device, a control device, a proximity terminal positioned in the proximity of the terminal device, and a server device which detects the proximity terminal.

This application is based upon and claims the benefit of priority of the prior Japanese Patent Application No. 2013-064838, filed on Mar. 26, 2013, the entire contents of which are incorporated herein by reference.

BACKGROUND ART

In the 3GPP (the 3rd Generation Partnership Project) which is the standardization group for a mobile communication system, the specification work of EPS (Evolved Packet System) described in Non Patent Literature 1 as the next generation mobile communication system has proceeded, a wireless LAN (WLAN) as well as LTE (Long Term Evolution) as an access system connected to the EPS has been examined.

In the 3GPP, as described in Non Patent Literature 2, proximity services (ProSe) that notify user equipment (UE) of the presence of other user equipment in proximity have been examined. In the ProSe, the UE can directly transmit and receive data to and from the proximity UE without a base station. In the ProSe, since the data is directly transmitted and received between the UEs, a mobile communication network or a wireless LAN network is not used, and data traffic can be offloaded. Thus, it is possible to avoid the concentration of traffic in the LTE.

In the ProSe, the use of two methods as a direct communication path between the UEs has been examined. The first me-hod is a method (hereinafter, referred to as LTE Direct) of establishing the direct communication path between the UEs using an LTE access technology, and the second method is a method of establishing the direct communication path using a wireless LAN access technology. In the LTE Direct, the UE uses a commercial frequency allocated in an LTE system of each mobile communication provider, and directly transmits and receives data to and from the another UE by using an LTE communication system. In the WLAN Direct, the UE uses a non-commercial frequency allocated in the WLAN, and directly transmits and receives data to and from the another UE.

In the ProSe, the necessity for the UE to detect the presence of the communication target UE in proximity by discovering a communication target UE in order to transmit and receive data through the LTE Direct or the WLAN Direct is given as a service required condition.

In order to provide a service by the mobile communication provider, direct communication between the UEs is defined as being required for an approval of the mobile communication provider at the time of establishing the direct communication path between the UEs.

Meanwhile, there is a possibility that the service itself using the direct communication as the target will also be provided by a service provider of a third party different from the mobile communication provider and the UE. The service provider manages information regarding the UE that participates in a direct communication service, and a UE that does not participate in the direct communication service is not able to perform the direct communication. That is, it is necessary to consider the information managed by the service provider and permission information managed by the mobile communication provider, and the UE can start the direct communication in consideration of the information managed by the service provider and the permission information managed by the mobile communication provider.

As stated above, an object of the ProSe is to provide a service that notifies a certain UE of the presence of the proximity UE, and a service that provides communication through the direct communication path between the UEs.

CITATION LIST

Non Patent Literature

NPL 1: 3GPP TS23.401 Technical Specification Group Services and System Aspects, General Packet Radio Service (GPRS) enhancements for Evolved Universal Terrestrial Radio Access Network (E-UTRAN) access NPL 2: 3GPP TR22.803 Technical Specification Group Services and System Aspects, Feasibility study for Proximity Services (ProSe)

SUMMARY OF INVENTION

Technical Problem

However, since there is no means for realizing a notification method of the proximity terminal and an establishment method of the direct communication path between the UEs, the UE starts the discovery at random when the UE as a communication source discovers the UE as the communication target irrespective of whether or not the communication target UE is in proximity. When the communication target UE is not in proximity, the communication target UE is not discovered, and the communication source UE wastes power consumption.

When the UE starts the transmission and reception of data through the ProSe, even though the communication target UE is in the proximity of the communication source UE, if the communication source UE requests the transmission and reception of data through the LTE Direct and the communication target UE is not able to perform the transmission and reception of data through the LTE Direct, unnecessary discovery is started, and thus, the communication source UE wastes the power consumption.

When the UE starts the transmission and reception of data through the ProSe, even though the communication target UE is in the proximity of the communication source UE, if the communication source UE requests the transmission and reception of data through the WLAN Direct and the communication target UE is not able to perform the transmission and reception of data through the WLAN Direct, the unnecessary discovery is started, and thus, the communication source UE wastes the power consumption.

Since the mobile communication provider has no means for granting permission or non-permission for the establishment of the direct communication path of the UE, the mobile communication provider is not able to provide a proximity communication service to a user.

Since the mobile communication provider does not manage the information managed by the service provider, it is difficult to start the direct communication with only the permission of the mobile communication provider.

An aspect of the present invention has been made in view of the above circumstances, and it is an object of the present invention to provide a mobile communication system in which a communication source UE efficiently discovers a communication target UE and performs notification and a mobile communication provider provides direct communication between the UEs or to the UEs when data is transmitted and received in ProSe.

Solution to Problem

According to an aspect of the present invention, there is provided a terminal device of a mobile communication system that includes a server device which detects a proximity terminal, a control device, the terminal device, and a proximity terminal device which is positioned in the proximity of the terminal device. The terminal device is adapted to: transmit a request message which requests the establishment of the direct communication path capable of being established and the detection of the proximity terminal to the control device; receive information regarding a proximity terminal device positioned at a distance capable of establishing a direct communication path correlated with an application, information regarding the direct communication path capable of being established, and a response message indicating that the establishment of the direct communication path capable of being established is permitted and the proximity terminal is notified; and establish the direct communication path with the proximity terminal device based on the response message.

In the aspect of the present invention, the terminal device may be adapted to: retain a first APN that permits the establishment of the direct communication path and the detection of the proximity terminal, and a second APN that does not permit the establishment of the direct communication path and the detection of the proximity terminal; and may be adapted to transmit the request message which requests an approval for the establishment of the direct communication path capable of being established and the detection of the proximity terminal to the control device by including an APN which permits the establishment of the direct communication path and the detection of the proximity terminal.

According to another aspect of the present invention, there is provided a terminal device which is adapted to: transmit a request message that requests the establishment of a communication path and the detection of a proximity terminal by including an APN which does not permit the establishment of a direct communication path and the detection of a proximity terminal, to a control station; receive a contact list, a usable communication path, and a response message indicating that the establishment of the communication path and the detection of the proximity terminal are permitted, from a control device; establish the communication path based on the response message; manage an application and a communication path in correlation with each other; and select the direct communication path or the communication path based on the correlation of the application with the communication path to transmit application data by using the selected communication path.

According to still another aspect of the present invention, there is provided a control device of a mobile communication system that includes a server device which detects a proximity terminal, the control device, a terminal device, and a proximity terminal device which is positioned in the proximity of the terminal device. The control device is adapted to: manage identification information of the terminal device, and permission information indicating that the establishment of a direct communication path and the detection of the proximity terminal are permitted in correlation with each other; receive a request message which requests an approval for the establishment of direct communication path the detection of the proximity terminal, which is transmitted from the terminal device; and permit the establishment of the direct communication path of the terminal device and the detection of the proximity terminal, based on the correlation of the identification information of the terminal device with the permission information indicating that the establishment of the direct communication path is permitted.

According to still another aspect of the present invention, there is provided a base station device of a mobile communication system that includes a server device which detects a proximity terminal, a control device, a terminal device, and the base station device. The base station device is adapted to: receive a notification that includes a contact list, a usable communication path, and information indicating whether or not the establishment of a direct communication path and the detection of a proximity terminal of the terminal device are permitted, from the control device; and allocate a radio resource for transmitting and receiving data to and from the terminal device based on the permission information included in the notification.

Advantageous Effects of Invention

According to the aspect of the present invention, when the terminal device as the communication source performs the transmission and reception of data in the ProSe, it is possible to prevent the power consumption of the terminal device as the communication source from being inefficiently consumed by discovering the proximity terminal as the communication target without unnecessarily discovering the proximity terminal as the communication target.

It is possible to discover the proximity terminal as the communication target by giving the condition for discovering the proximity terminal as the communication target to the terminal device as the communication source, and it is possible to realize the start of the transmission and reception of data in the ProSe.

The mobile communication provider determines whether or not to permit the establishment of the direct communication path between the terminal devices, and thus, it is possible to provide the direct communication between the terminal devices to the terminal devices.

The mobile communication provider detects the information managed by the service provider, and thus, it is possible to start the direct communication by using the permission of the mobile communication provider and the information managed by the service provider.

BRIEF DESCRIPTION OF DRAWINGS

FIG. 3 is a diagram for describing the functional configuration of a UE according to the first embodiment.

FIG. 4A is a first diagram showing an example of the functional configuration managed in a storage unit of the UE.

FIG. 4B is a second diagram showing an example of the functional configuration managed in the storage unit of the UE.

FIG. 6A is a first diagram showing an example of a communication path for each application classification and Server contact list.

FIG. 6B is a second diagram showing an example of the communication path for each application classification and Server contact list.

FIG. 7A is a first diagram showing an example of a proximity detection policy and a positional information management table.

FIG. 7B is a second diagram showing an example of a proximity detection policy and a positional information management table.

FIG. 16A is a first diagram showing an example of proximity detection according to the first embodiment.

FIG. 16B is a second diagram showing an example of the proximity detection according to the first embodiment.

FIG. 16C is a third diagram showing an example of the proximity detection according to the first embodiment.

FIG. 19 is a diagram showing an example of a UE contact list managed in the UE.

FIG. 20 is a diagram showing an example of a Server contact list managed in the ProSe Server.

FIG. 21A is a diagram showing an LTE(D) availability management table managed in the UE.

FIG. 21B is a diagram showing the WLAN(D) availability management table.

FIG. 22 is a diagram showing a Server contact list including LTE(D) availability and WLAN(D) availability in the ProSe Server.

FIG. 23 is a diagram showing a case where the LTE(D) availability and the WLAN(D) availability are updated in the Server contact list.

FIG. 24 is a diagram showing an example of a UE action policy in the UE.

FIG. 25 is a diagram showing an example of a proximity detection policy in the ProSe Server.

FIG. 26 is a diagram showing an example of the proximity detection.

DESCRIPTION OF EMBODIMENTS

Hereinafter, embodiments for implementing the present invention will be described with reference to the drawings. For example, in the present embodiment, embodiments of a mobile communication system when the present invention is applied will be described in detail with reference to the drawings. LTE Direct is referred to as LTE(D), and WLAN Direct is referred to as WLAN(D). Here, the LTE(D) implies that a direct communication path is established between UEs by using an LTE communication method, and the WLAN(D) implies that a direct communication path is established between the UEs by using a WLAN communication method.

[1. First Embodiment]

First, a first embodiment to which the present invention is applied will be described with reference to the drawings.

[1.1 Outline of Mobile Communication System]

Figure 1:
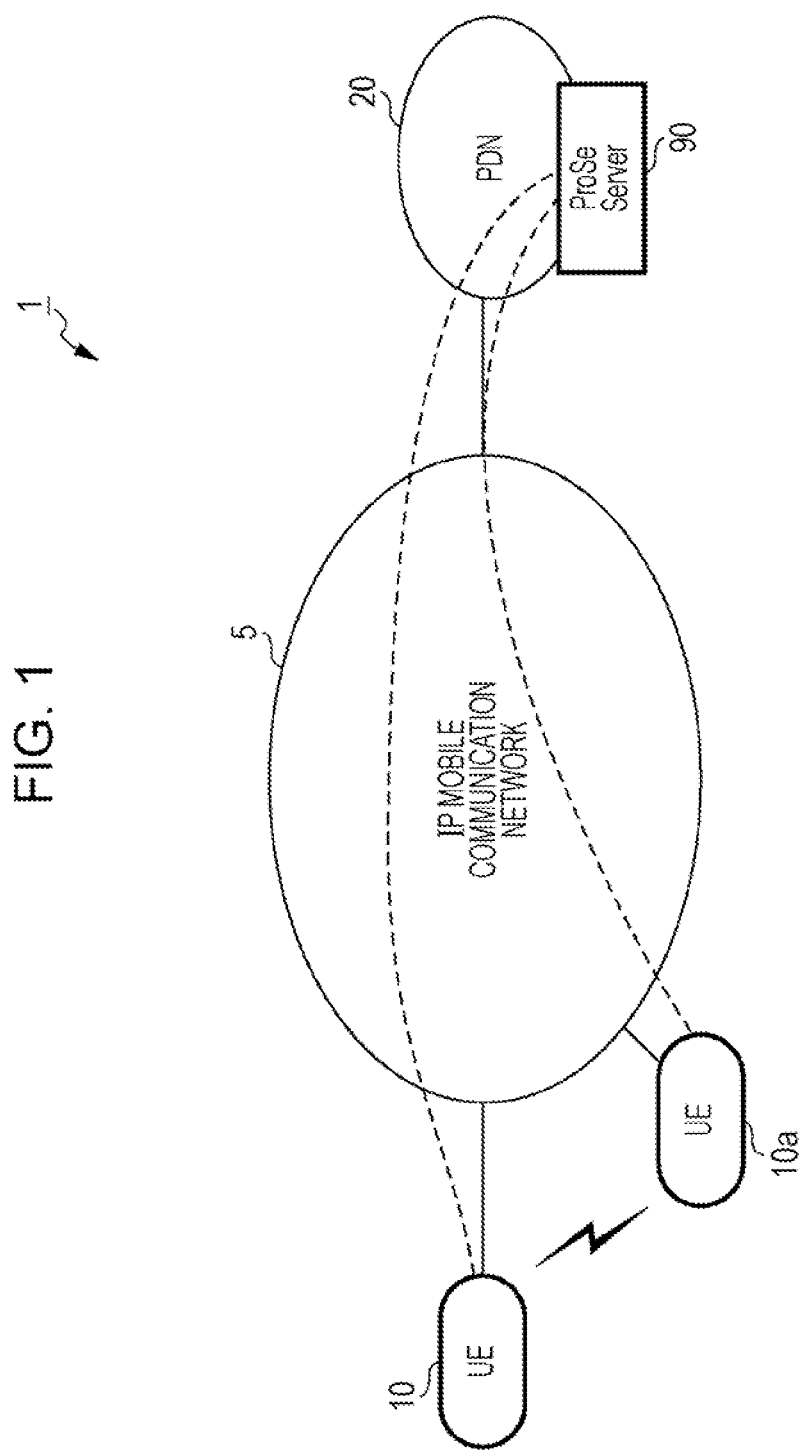
FIG. 1 is a diagram for describing the outline of a mobile communication system 1 according to a first embodiment.

FIG. 1 is a diagram for describing the outline of a mobile communication system 1 according to the present embodiment. As shown in this drawing, the mobile communication system 1 includes the UE (mobile station device) 10, the DE (mobile station device) 10a, and a PDN (Packet Data Network) 20, which are connected via an IP mobile communication network 5. A ProSe Server 90 is provided in the PDN 20. The ProSe Server 90 may be provided in any position of the PDN 20. The UE 10 and the UE 10a ensure secure communication with the ProSe Server 90, and thus, the ProSe Server 90 can transmit and receive control information or data.

The UE 10 and the UE 10a are in proximity to each other, and are positioned in places where the UEs can discover each other in proximity discovery for starting the transmission and reception of data through ProSe.

For example, the IP mobile communication network 5 may be a network which includes a core network and a wireless access network operated by a mobile communication provider, or may be a broadband network operated by a fixed-line communication provider. The IP mobile communication network operated by the mobile communication provider will be described below in detail.

The broadband network refers to an IP communication network operated by a communication provider that is connected through ADSL (Asymmetric Digital Subscriber Line) and provides high-speed communication using a digital line such as an optical fiber. The broadband network is not limited to the above example, but may be a network that allows for wireless access using WiMAX (Worldwide Interoperability for Microwave Access).

The UE 10 is a communication terminal that is connected using an access system such as LTE or WLAN, and can be connected to the IP network by being connected using a built 3GPP LTE communication interface or WLAN communication interface.

As a specific example, the UE is a portable telephone terminal or a smartphone, or the UE is a household electrical appliance, a tablet computer, or a personal computer, which has a communication function.

The PDN 20 refers to a network that provides a network service for transmitting and receiving data in packets, and is, for example, the internet or an IMS.

The PDN 20 is connected to the IP access network by using a wired line. For example, the PDN is established by ADSL (Asymmetric Digital Subscriber Line) or an optical fiber. The PDN is not limited to the above example, but may be a wireless access network such as LTE (Long Term Evolution), WLAN (Wireless LAN), or WiMAX (Worldwide Interoperability for Microwave Access).

[1.1.1 Configuration Example of IP Mobile Communication Network]

Figure 2A:
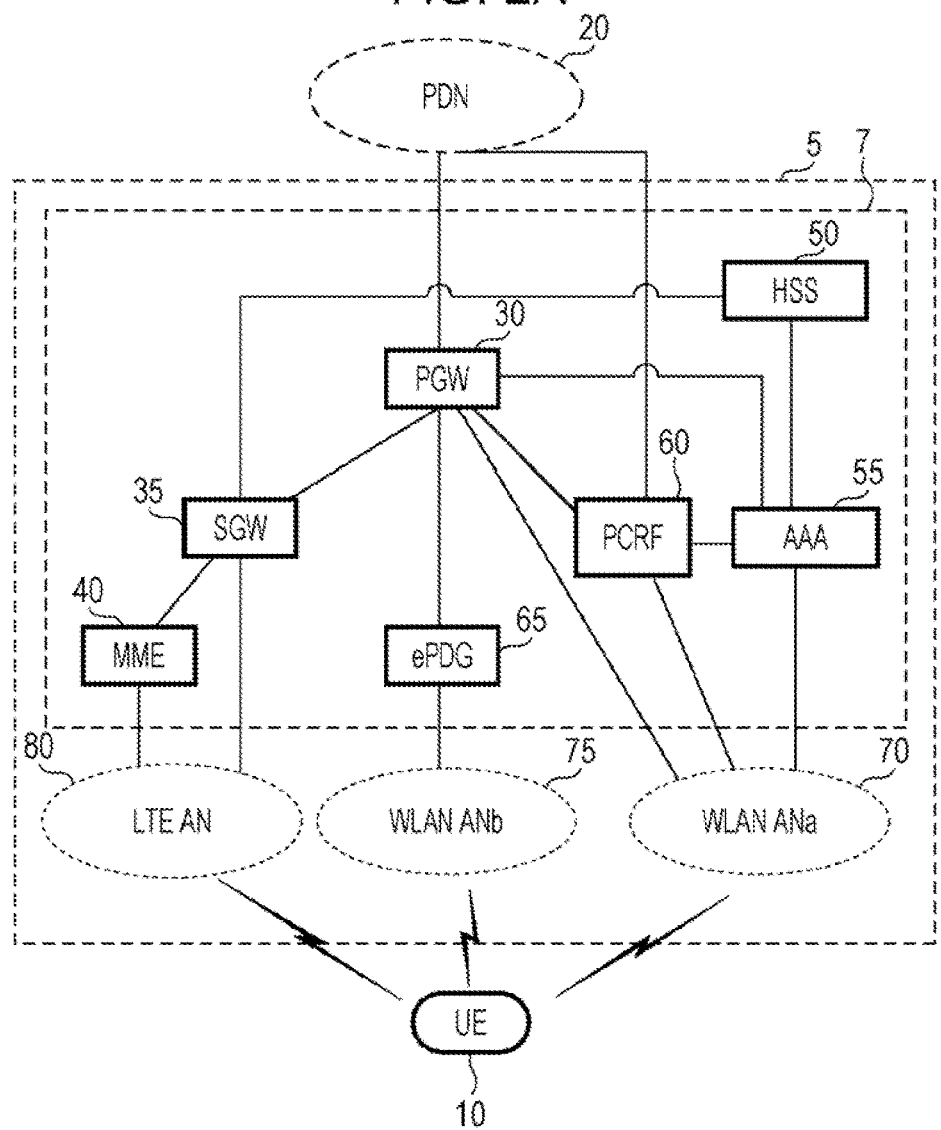
FIG. 2A is a first diagram for describing the configuration of an IP mobile communication network.
Figure 2B:
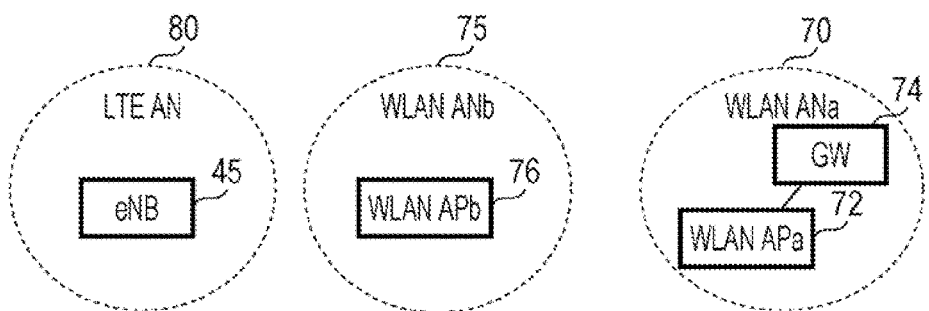
FIG. 2B is a second diagram for describing the configuration of the IP mobile communication network.

As shown in FIGS. 2A and 2B, the mobile communication system 1 includes the UE 10, the IP mobile communication network 5, and the PDN 20 (Packet Data Network). The UE 10a is a UE different from the UE 10 and has the same configuration as that of the UE 10, and thus, the description thereof will be omitted. In addition to the UE 10 or the UE 10a, a plurality of UEs may be connected to the IP mobile communication network 5, but will be omitted for the sake of simplification in the drawings. The IP mobile communication network 5 includes a core network 7 and the respective wireless access networks. The detailed configuration of the core network 7 is illustrated in FIG. 2A.

The PDN 20 is a network that provides a network service for transmitting and receiving data in packets as described in FIG. 1, and is, for example, the Internet or an IMS.

The core network 7 includes a PGW (access control device) 30 (Packet Data Network Gateway), a SGW 35 (Serving Gateway), a MME 40 (Mobile Management Entity), a HSS 50 (Home Subscriber Server), an AAA 55 (Authentication, Authorization, and Accounting), a PCRF 60 (Policy and Charging Rules Function), and an ePDG 65 (enhanced Packet Data Gateway).

The wireless access network may include a plurality of different access networks. The respective access networks are connected to the core network 7. The UE 10 can be wirelessly connected to the wireless access network.

The wireless access network may be implemented using an LTE access network (LTE AN 80) that can be connected in an LTE access system, or an access network that can be connected in a WLAN access system.

The access network that can be connected in the WLAN access system may include a WLAN access network b (WLAN ANb 75) that is connected using the ePDG 65 as a connection device to the core network 7, and a WLAN access network a (WLAN ANa 70) that is connected to the PGW 30, the PCRF 60 and the AAA 55.

The devices have the same configurations as those of the devices of the related art in the mobile communication system using an EPS, and thus, the detailed description thereof will be omitted, but the functions thereof will be briefly described. The PGW 30 is connected to the PDN 20, the SGW 35, the ePDG 65, the WLAN ANa, the PCRF 60 and the AAA 55, and serves as a gateway device between the core network 7 and the PDN 20 to deliver user data.

The SGW 35 is connected to the PGW 30, the MME 40, and the LTE AN 80, and serves as a gateway device between the LTE AN 80 and the core network 7 to deliver user data.

The MME 40 is connected to the SGW 35 and the LTE AN 80, and is an access control device that performs access control of the UE 10 via the LTE AN 80.

The HSS 50 is connected to the SGW 35 and the AAA 55, and manages subscriber information. The AAA 55 is connected to the PGW 30, the HSS 50, the PCRF 60 and the WLAN ANa 70, and performs access control of the UE 10 which is connected via the WLAN ANa 70. The PCRF 60 is connected to the PGW 30, the WLAN ANa 70 and the AAA 55, and manages QoS for the delivery of user data.

The ePDG 65 is connected to the PGW 30 and the WLAN ANb 75, and serves as a gateway device between the core network 7 and the WLAN ANb 75 to deliver user data.

As shown in FIG. 2B, each of the wireless access networks includes a device (for example, base station device or access point device) to which the UE 10 is actually connected. Although various devices compliant with the wireless access networks are considered as a device used for connection, the LTE AN 80 includes the eNB 45 in the present embodiment. The eNB 45 is a wireless base station to which the UE 10 is connected in the LTE access system, and the LTE AN 80 may include one wireless base station or a plurality of wireless base stations.

The WLAN ANa 70 includes a WLAN APa 72, and a GW 74 (Gateway). The WLAN AP 72 is a wireless base station to which the UE 10 is connected in the WLAN access system, and the WLAN AN 70 may include one wireless base station or a plurality of wireless base stations. The GW 74 is a gateway device between the core network 7 and the WLAN ANa 70. The WLAN APa 72 and the GW 74 may be implemented by a single device.

As stated above, the gateway included in the WLAN ANa 70 can be connected to the plurality of devices within the core network 7. When the provider that operates the core network 7 and the provider that operates the WLAN ANa 70 are different from each other, such a configuration may be operated when a trust relationship is established by an operational contract or agreement between the providers. In other words, the WLAN APa 72 is an access network having reliability for the provider that operates the core network 7.

The WLAN ANb 75 includes a WLAN APb 76. The WLAN AP 76 is a wireless base station to which the UE 10 is connected in the WLAN access system, and the WLAN AN 75 includes one wireless base station or a plurality of wireless base stations.

As mentioned above, the WLAN ANb 75 is connected to the core network 7 by using the ePDG 65 which is the device included in the core network 7 as a gateway. The ePDG 65 has a security function for ensuring safety. When the provider that operates the core network 7 and the provider that operates the WLAN ANa 70 are different from each other, such a configuration is operated when a trust relationship is not established by an operational contract or agreement between the providers. In other words, the WLAN APa is an access network that does not have reliability for the provider that operates the core network 7, and provides safety in the ePDG 65 included in the core network 7.

In the present specifications, the UE 10 being connected to the respective wireless access networks means that the UE is connected to the base station devices or the access points included in the respective wireless access networks, and data or signal to be transmitted and received passes through the base station device or the access point.

For example, the UE 10 being connected to the LTE AN 80 means that the UE 10 is connected via the eNB 45, and the UE being connected to the WLAN ANa 70 means that the UE is connected via the WLAN APa 72 and/or the GW 74. The UE 10 being connected to the WLAN ANb 75 means that the UE 10 is connected to the WLAN APb 76.

[1.2 Device Configuration]

Next, the configurations of the respective devices will be simply described with reference to the drawings.

[1.2.1 Configuration of UE]

FIG. 3 shows the functional configuration of the UE 10 according to the present embodiment. In the UE 10, an LTE interface 110, a WLAN interface 120 and a storage unit 140 are connected to a control unit 100 through a bus.

The control unit 100 is a functional unit for controlling the UE 10. The control unit 100 realizes various processes by reading various programs stored in the storage unit 140 and executing the read program.

The LTE interface 110 is a functional unit that transmits and receives data through wireless communication by using an LTE access method. An external antenna 112 is connected to the LTE interface 110.

The UE 10 may perform communication by being connected to an LTE base station through the LTE interface and being connected to the IP access network 5, or may perform communication by establishing a direct communication path with another UE without using the LTE base station.

The WLAN interface 120 is a functional unit that transmits and receives data through wireless communication by using a wireless LAN access method. An external antenna 122 is connected to the WLAN interface 120.

The UE 10 may perform communication by being connected to a WLAN base station through a WLAN interface and being connected to the IP access network 5, or may perform communication by establishing a direct communication path with another UE without using the WLAN base station.

The storage unit 140 is a functional unit that stores programs and data required for various operations of the UE 10. For example, the storage unit 140 is a semiconductor memory or a hard disk drive (HDD). An APP list 142 is stored in the storage unit 140.

Applications that can be used by the UE 10 are stored in the APP list 142. FIG. 4A is a diagram showing an example of the APP list 142. In the APP list 142 of FIG. 4A, the applications that can be used by the UE 10 are represented as APP 1 to APP 3.

The application may be managed by being distinguished from a different application according to data classification such as VoIP, video streaming, video file, or text.

Alternatively, the application may be managed by distinguishing communication using middleware such as IMS as a single application.

Alternatively, an individual application such as Skype or LINE may be managed by being distinguished by an application name or an application ID.

Alternatively, the application may be managed by being distinguished as a different application by using a combination thereof.

Here, the applications that can be used by the UE 10 may be installed in the manufacturing step thereof, or may be installed by a user operation.

The UE 10 may be managed by correlating information of a communication path that can be used for each application with the application. For example, as shown in FIG. 4A, categories (Cat. 1 to Cat. 3) are associated with the applications (APP 1 to APP 3). The respective categories are respectively correlated with the communication paths that can be used by the applications.

In the example of FIG. 4A, the Cat. 1 indicates that it is possible to use the direct communication of the LTE(D), the Cat. 2 indicates that it is possible to use the direct communication of the WLAN(D), and the Cat. 3 indicates that it is possible to use the direct communication of the LTE(D) and the direct communication of the WLAN(D). In the case of the Cat. 3, the UE 10 can use the communication by selecting any one of the LTE(D) or the WLAN(D).

FIG. 4B is a diagram showing UE contact lists 144 for APPs. In FIG. 4B, the contact list of the APP 1, the contact list of the APP 2 and the contact list of the APP 3 are managed. In the UE contact lists 144 for APPs, the UEs capable of performing direct communication through the ProSe are managed. Alternatively, the UEs capable of performing communication using the respective APPs may be managed.

Proximity discovery unnecessary check boxes indicating that it is not able to perform the proximity discovery on UEs may be managed in correlation with the UEs of the UE contact lists 144.

When the proximity discovery unnecessary check boxes are checked, the UEs of the UE contact lists 144 correlated with the checked check boxes means that it is not able to perform the proximity detection on the UE 10. That is, the UE 10 may manage whether or not to allow the respective UEs of the UE contact lists 144 to perform the proximity detection. The proximity discovery unnecessary check boxes may be updated through configuration performed by a user.

Although it has been described in the present example that whether or not the proximity discovery is necessary is correlated with the respective APPs of the UE 10, whether or not the proximity discovery is necessary may be managed in correlation with the UE contact lists 144. In this case, whether or not the proximity discovery is necessary may be configured for all the UEs of the contact lists all at once.

Whether or not the proximity discovery is necessary may be managed in correlation with the UE contact lists 144 of all the applications. In this case, whether or not the proximity discovery is necessary may be configured for all the UEs of all the contact lists all at once.

That is, when the UE of the UE contact list 144 detects a proximity UE, the UE 10 can exclude the UE 10 itself from a detection target based on the proximity discovery unnecessary check boxes.

As shown in FIG. 4B, the UEs capable of performing the direct communication through the ProSe may be managed for each application, and the fact that the proximity discovery is unnecessary may be managed for each UE managed by the contact lists.

The UE 10a to the UE 10n shown in FIG. 4B are UEs different from the UE 10 and the configurations thereof are the same as that of the UE 10, and thus, the detailed description thereof will be omitted.

[1.2.2 Configuration of ProSe Server]

Figure 5:
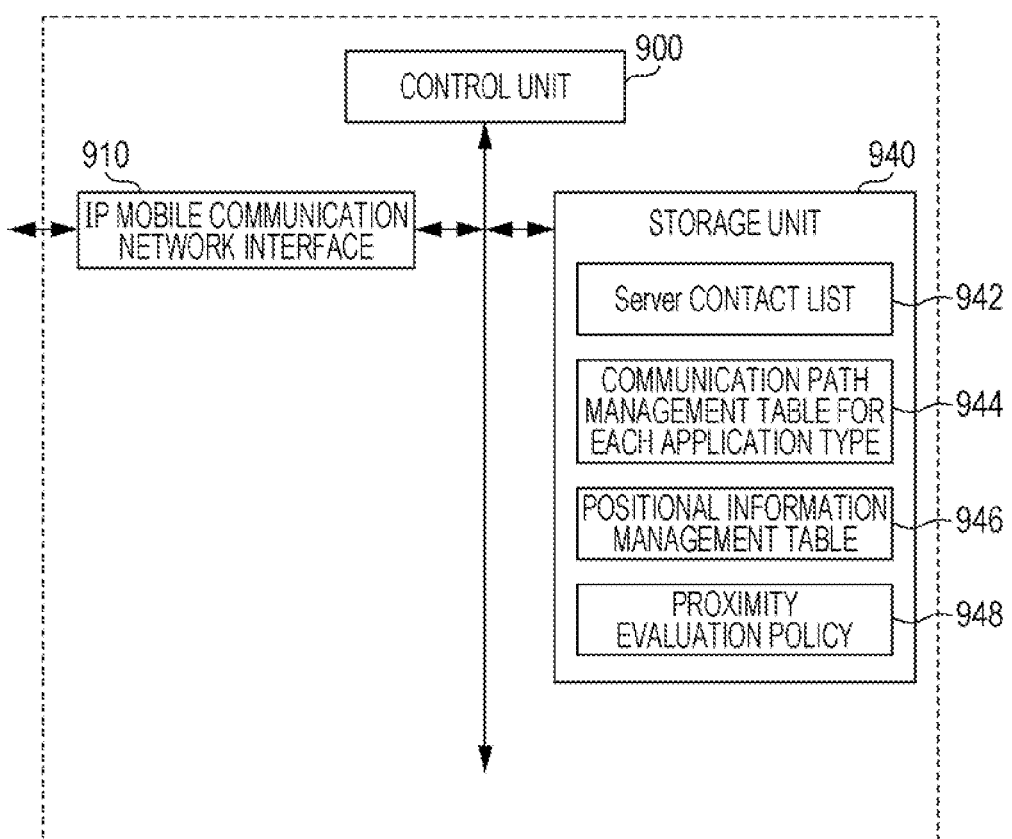
FIG. 5 is a diagram for describing the functional configuration of a ProSe Server.

FIG. 5 shows the functional configuration of the ProSe Server 90. In the ProSe Server 90, an IP mobile communication network interface 910 and a storage unit 940 are connected to a control unit 900 through a bus.

The control, unit 900 is a functional unit for controlling the UE 10. The control unit 900 realizes various processes by reading various programs stored in the storage unit 940 and executing the read program.

The IP mobile communication network interface 910 is a functional unit for allowing the ProSe Server 90 to be connected to the IP mobile communication network 5.

The storage unit 940 is a functional unit that records programs and data required for various operations of the UE 10. For example, the storage unit 940 is a semiconductor memory, or a hard disk drive (HDD).

The storage unit 940 stores Server contact lists 942, a communication path management table 944, a positional information management table 945, and a proximity detection policy 948.

The Server contact lists 942, the communication paths for application classifications 944 and the positional information management table 946 may be stored in an external device. For example, these items may be stored in the HSS 50, and may be referred to or updated by inquiring of the HSS 50 if necessary.

FIG. 6A shows an example in which the Server contact lists 942 are managed for applications that can be used by a certain UE in the example of the Server contact lists 942. In FIG. 6A, contact lists in the APP 1 to the APP 3 of the UE 10 are represented.

The application may be managed by being distinguished from a different application according to data classification such as VoIP, video streaming, video file, or text.

Alternatively, the application may be managed by distinguishing communication using middleware such as IMS as a single application.

Alternatively, an individual application such as Skype or LINE may be managed by being distinguished by an application name or an application ID.

Alternatively, the application may be managed by being distinguished as a different application by using a combination thereof.

In the contact lists of FIG. 6A, UE lists (UE 10a to UE 10n) that can perform the direct communication with the UE 10 through the ProSe may be managed by being correlated with proximity discovery unnecessary check boxes.

The proximity discovery unnecessary check box being checked means that the UE 10 is not able to detect the UEs managed as the proximity discovery unnecessary, as proximity terminals. That is, the ProSe Server 90 can manage whether or not to determine the respective UEs of the Server contact lists 942 as targets to be subjected to the proximity detection for each application of the UE 10. The proximity discovery unnecessary check boxes can be updated through configuration performed by the user.

Although it has been described in the present example that whether or not to the proximity discovery is necessary is correlated with the respective UEs of the Server contact lists 942, whether or not to the proximity discovery is necessary may be managed in correlation with the Server contact lists 942. In this case, whether or not to the proximity discovery is necessary may be configured for all the UEs of the Server contact lists 942 all at once.

Whether or not to the proximity discovery is necessary may be managed in correlation with all the applications. In this case, whether or not to the proximity discovery is necessary may be configured for all the UEs of all the Server contact lists 942 of the UE 10 all at once.

In the above description, although the contact list for each application of the UE 10 has been described, the ProSe Server 90 similarly stores the ProSe Server contact lists 942 of the UEs (for example, UE 10a to UE 10n) different from the UE 10.

FIG. 6B shows an example of the communication path management table 944 for each application classification. In the communication path management table 944 for each application classification, the applications are managed in correlation with the communication paths that can be used in the applications.

The application may be managed by being distinguished from a different application according to data classification such as VoIP, video streaming, video file, or text.

Alternatively, the application may be managed by distinguishing communication using middleware such as IMS as a single application.

As the communication path that can be used in the application, the communication path such as the LTE(D), the WLAN(D) or another method that can be used is managed in correlation with each application.

In the example of FIG. 6B, the categories (Cat. 1 to Cat. 3) that transmit and receive data through the ProSe permitted by the mobile communication provider are managed for applications or services. The Cat. 1 indicates that it is possible to use the direct communication of the LTE(D), the Cat. 2 indicates that it is possible to use the direct communication of the WLAN(D), and the Cat. 3 indicates that it is possible to use the direct communication of the LTE(D) and the direct communication of the WLAN(D). In the case of the Cat. 3, the UE 10 can selectively use any one of the LTE(D) and the WLAN(D).

For example, since the APP 1 is associated with the Cat. 1, the APP 1 is supported by the direct communication of the LTE(D). Since the APP 2 is associated with the Cat. 2, the APP 2 is supported by the direct communication of the WLAN(D). Since the APP 3 is associated with the Cat. 3, the APP 3 is supported by the direct communication of the LTE(D) and the direct communication of the WLAN(D). When it is possible to use the LTE(D) and the WLAN(D) as in the Cat. 3, the UE 10 can select the LTE(D) or the WLAN(D).

FIG. 7A shows an example of the positional information management table 946. In the positional information management table of FIG. 7A, positional information items of the U's capable of performing the direct communication through the ProSe are stored for the respective UEs. The ProSe Server 90 manages the positional information items notified from the UEs in the positional information management table 946. In FIG. 7A, the UE 10 is provided in a position A and a position a, and the UE 10a is provided in a position A and a position b. The UE 10b is provided in a position B, the UE 10c is provided in a position C, and the UE 10zz is provided in a position x. As shown in FIG. 7A, the positional information managed for each UE may be one or plural.

The position A and the position a of the UE 10 may be, for example, identification information of an LTE base station and identification information of a WLAN base station to which the UE 10 is connected. In addition, the positional information managed for each UE may be positional information calculated by the GPS, or information for identifying an area. The positional information managed for each UE may be a SSID, a BSSID, or a Realm used for connection in the WLAN, or other information.

Although the position for each UE is managed irrespective of the service and application in FIG. 7A, the position for each UE may be managed for each application or each service. When the position for each UE is managed for service, the position for each UE may be managed by being included in the contact list.

FIG. 7B shows an example of the proximity detection policy 948. The proximity detection policy 948 includes a rule for evaluating whether or not the UE 10 and another UE different from the UE 10 are positioned in proximity based on the positional information management table 946. The ProSe Server 90 may evaluate whether or not the communication path (LTE(D) and/or WLAN(D)) of the direct communication can be used between a communication source UE and a communication target UE based on the proximity detection policy 948.

FIG. 7B shows an example of the determined result and the content of the policy through the proximity detection policy 948. The content of the policy manages determination methods using an access point (AP) name, a service set identifier (SSID), a Realm (facility information), or an eNB ID (base station information of the mobile communication provider).

Here, the AP, SSID, and Realm are identifiers that can be obtained by the UE when the UE is connected to the WLAN, are obtained in any one of the WLAN APa 72 and the WLAN APb 76, and can be notified to the ProSe Server 90. The ProSe Server 90 manages the positions based on the notification of the positional information items of the UEs. When the UE 10 is connected to the WLAN APa 72 or the WLAN APb 76, all of the AP, the SSID and the Realm may be obtained in some cases, or only any one of the AP, the SSID and the Realm may be obtained in some cases.

That is, the UE 10 may notify the ProSe Server 90 of all of the AP, the SSID and the Realm in some cases, or may notify the ProSe Server of only any one of the AP, the SSID and the Realm in some cases. Even when the AP, the SSID and the Realm are obtained from the WLAN (WLAN APa 72 or WLAN APb 76), the UE 10 may not notify the ProSe Server 90 of any one of the AP, the SSID and the Realm or some thereof in some cases.

The eNB ID is an identifier that can be obtained when the UE 10 is connected to the eNB 45. When the eNB ID is newly obtained from the eNB 45, the UE 10 notifies the ProSe Server 90 of the obtained eNB ID. Even when the eNB ID is newly obtained, the UE 10 may not notify the ProSe Server 90 in some cases.

The contents of the respective policies will be described. The AP name is an identification name for identifying each WLAN. Since the UEs connected to the same AP are located in the area of the single WLAN and are in proximity to each other with a very high probability, these UEs are determined to use the WLAN(D).

The SSID is an identifier for identifying the WLAN. One SSID may be configured for only a single WLAN, or one SSID may be configured for a plurality of WLANs. When one SSID is configured for the plurality of WLANs, since an office that is not covered by one WLAN may be present, the UEs that are positioned in the same SSID are in proximity to each other with a very high probability but not as high as the UEs that are positioned in the same AP are in proximity to each other, and thus, these UEs are evaluated to be able to use the WLAN(D).

The Realm is a name indicating facility information in the WLAN. Since the Realm is the name indicating the facility information, the UEs which have the same Realm and are connected to the WLAN are located in the facility corresponding to the Realm. Thus, the UEs positioned in the same Realm are in proximity to each other with a high probability but not as high as the UEs positioned the same AP or the same SSID are in proximity to each other, and thus, these UEs are evaluated to be able to use the WLAN(D).

The eNB 45 is an LTE base station managed by the mobile communication provider. When the UE 10 is connected to the eNB 45 in order to transmit and receive data to and from the LTE base station, the UE can detect the eNB ID. The UE 10 located in the LTE base station is positioned within a circular area having a radius of 500 m. Since two UEs are located in the same eNB, these UEs are evaluated to be able to use the LTE(D).

When there is not any correspondence, the UE is evaluated to be none. In this case, there are no usable direct communication paths, and the ProSe Server 90 may notify the UE 10 such that unnecessary proximity discovery is not performed.

[1.2.3 Configuration of MME]

Figure 8:
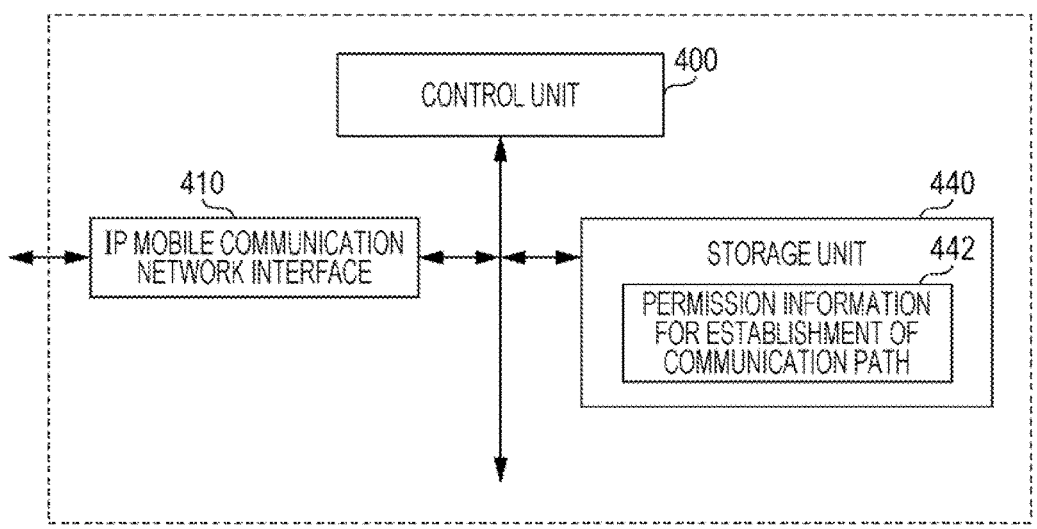
FIG. 8 is a diagram for describing the functional configuration of a MME.

FIG. 8 shows the functional configuration of the MME 40. In the MME 40, an IP mobile communication network interface 410, and a storage unit 440 are connected to a control unit 400 through a bus.

The control unit 400 is a functional unit for controlling the UE 10. The control unit 400 realizes various processes by reading various programs stored in the storage unit 440 and executing the read program.

The IP mobile communication network interface 410 is a functional unit for allowing the MME 40 to be connected to the IP mobile communication network 5.

The storage unit 440 is a functional unit that stores programs and data required for various operations of the UE 10. For example, the storage unit 440 is a semiconductor memory or a hard disk drive (HDD). Permission information 442 for communication path establishment is managed in the storage unit 440. The permission information 442 for communication path establishment may be stored in an external device, and may be stored in, for example, the HSS 50.

Here, the APN is connection destination information for allowing the UE 10 to transmit and receive data by being connected to the IP mobile communication network 5. Here, the UE 10 can use the communication path including a connection destination associated with the APN by notifying the permission information including the APN and being permitted from the MME 40 before the data is transmitted and received. The APN is previously configured in the manufacturing step of the UE 10 in some cases, or the APN needs to be separately configured in some cases when a SIM card is separately attached to the UE. The APN may be managed for each communication path, or may permit each communication path. For example, a plurality of APNs may be managed for communication path establishment or services to be provided, and the APN includes an APN of the communication path of the LTE(D) in the direct communication path may be managed for services, an APN correlated with permission information for the establishment of the communication path of the WLAN(D) in the direct communication path, and an APN which performs communication via the PGW 30 and is correlated with permission information for the establishment of the communication path via a macro.

Here, the communication via a macro means that the UE 10 transmits and receives data by using a communication path via a base station of a macro cell such as the eNB 45 using the LTE communication method. In this case, the UE 10 may request the establishment of PEN connection with the PGW 30 through the eNB 45 and the SGW 35, and may perform communication using the established PDN connection. The UE 10 may request the establishment of a radio bearer with the eNB 45 and an EPS bearer with the SGW 35 and the PGW 30, and may perform the communication using the established bearer.

The base station is not limited to the macro base station of the macro cell by using the LTE communication method, but may be a home base station or a femto base station of a cell smaller than the macro cell.

Figure 9:
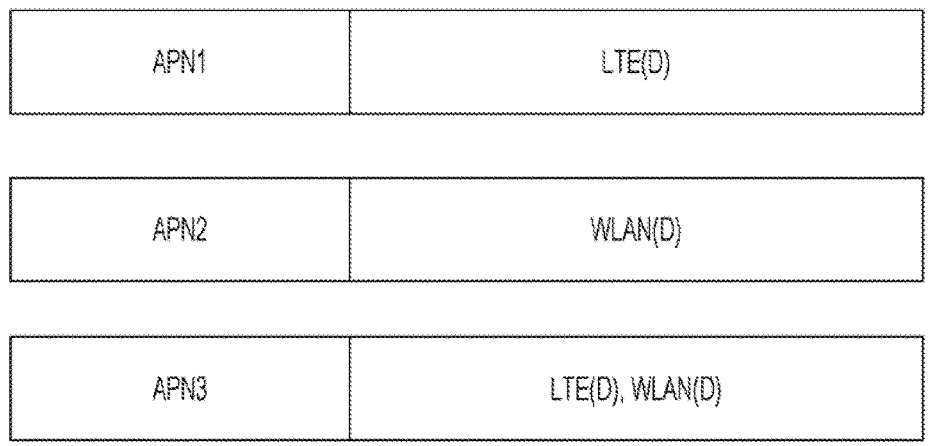
FIG. 9 is a diagram for describing permission information for the establishment of a communication path.

FIG. 9 shows an example of the permission information 442 for communication path establishment. In FIG. 9, the communication path to be permitted is managed in correlation with an APN.

In the example of FIG. 9, the LTE(D) is permitted in an APN 1, the WLAN(D) is permitted in an APN 2, and the LTE(D) and the WLAN(D) are permitted in an APN 3. In the APN 1, the APN 2 and the APN 3, the establishment of the PDN connection between the UE 10 and the PGW 30 is not permitted as the communication path by being connected to the core network through the LTE base station or the WLAN base station.

Here, the permission information for the APN is not intended as being permitted only for these APNs, but a different communication path may be permitted in an APN different from the APN 1 to the APN 3. The APN may be managed so as not to permit the establishment of the direct communication path of the LTE(D). Similarly, the APN may be managed so as not to permit the establishment of the direct communication path of the WLAN(D).

The MME 40 may determine whether or not to permit the establishment of the communication path based on the APN notified from the UE 10. For example, when the UE 1.0 notifies of the APN 1 which permits the establishment of the communication path of the LTE(D) and requests the establishment of the communication path of the LTE(D), it is possible to determine whether or not to permit the establishment of the communication path of the LTE(D) based on the APN notified from the SE 10 and the permission information 442 for communication path establishment.

As stated above, the MME 40 is a control device that determines whether or not to permit the service provision and the establishment of the communication path of the UE and controls the establishment of the communication path and the establishment of the service.

The MME may permit the request for the detection of the proximity terminal from the ProSe Server 90, to be described below, based on the permission information 442 for communication path establishment. The proximity detection means that the ProSe Server 90 detects a list of the UEs located in proximity enough to perform the direct communication with the UE 10. For example, in the APN 1, the detection of a proximity terminal capable of using the LTE(D) may be permitted based on the fact that the communication path associated with the APN 1 is the LTE(D). In the APN 2, the detection of a proximity terminal capable of using the WLAN(D) may be permitted based on the fact that the communication path associated with the APN 2 is the WLAN(D). In the APN 3, the detection of a proximity terminal capable of using the LTE(D) or the WLAN(D) may be permitted based on the fact that the communication path associated with the APN 3 is the LTE(D) and the WLAN(D).

Here, the proximity terminal capable of using the LTE(D) is a list of the UEs located in proximity enough to use the LTE(D). The proximity terminal capable of using the LTE (D) may be one or plural in number. The proximity terminal capable of using the WLAN(D) is a list of the UEs located in proximity enough to use the WLAN(D). The proximity terminal capable of using the WLAN(D) may be one or plural in number. The proximity terminal capable of using the LTE(D) or the WLAN(D) is a list of the UEs located in proximity enough to use the LTE(D) or the WLAN(D). The proximity terminal capable of using the LTE(D) or the WLAN(D) may be one or plural in number.

As mentioned above, the MME 40 can detect the request for the detection of the proximity terminal correlated with the direct communication based on the APN from the UE 10.

the MME 40 can request the proximity detection from the ProSe Server 90 based on the APN received from the UE 10.

[1.3 Description of Process]

Next, embodiments of a specific process in the mobile communication system will be described. In the present embodiment, the process includes a position registration procedure performed by the UE 10, a proximity discovery procedure of starting the transmission and reception of data, and a procedure of starting the transmission and reception of data. In the following description, LTE Direct for establishing the direct communication path between the UEs by using the LTE communication method is referred to as LTE(D), and WLAN Direct for establishing the direct communication path between the UEs by using the WLAN communication method is referred to as WLAN(D). The function of the LTE(D) or the function of the WLAN(D) in the UE 10 or the UE 10a is valid.

[1.3.1 UE Position Notification Procedure]

Figure 10:
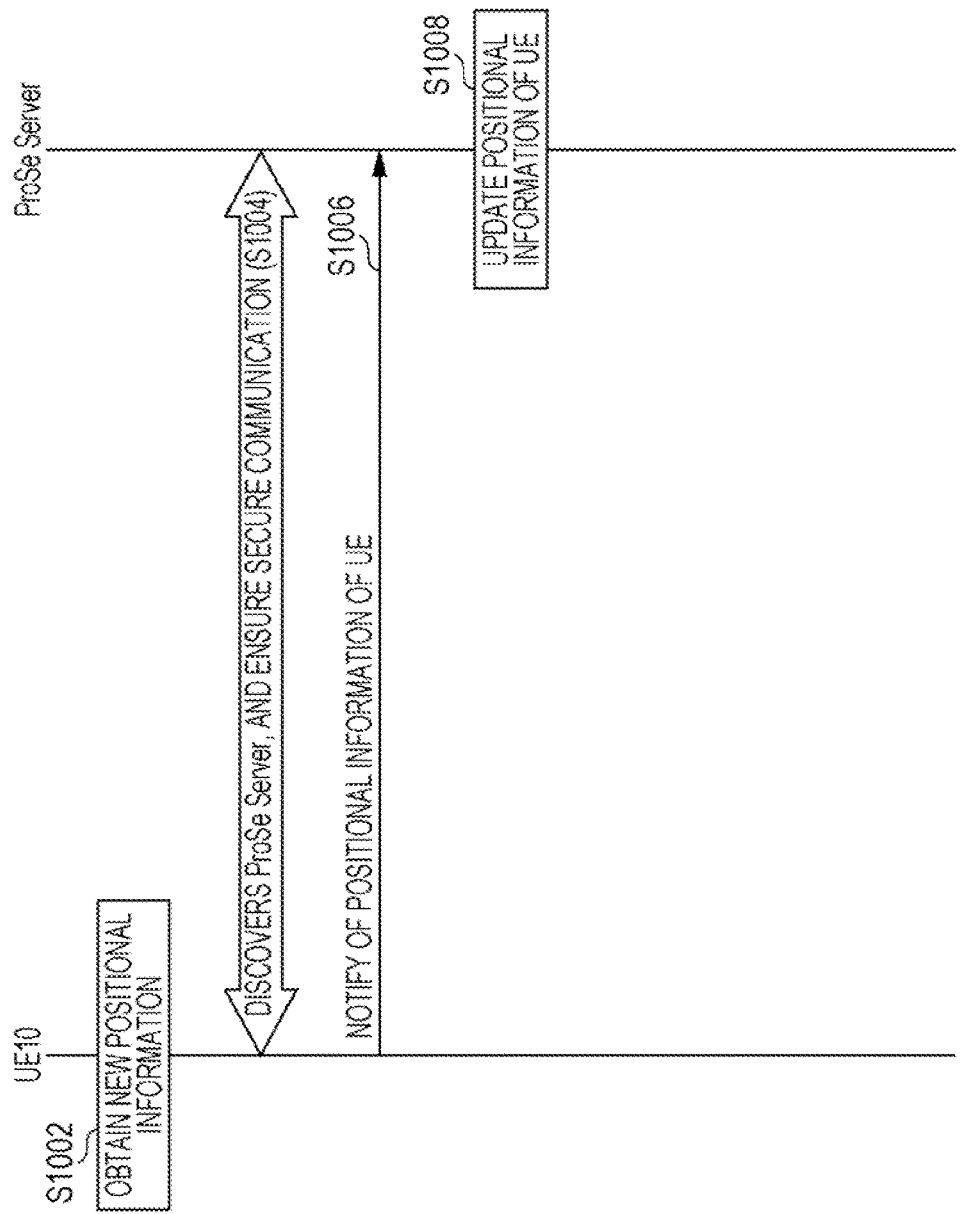
FIG. 10 is a diagram for describing a position notification procedure according to the first embodiment.

An example of the position registration procedure performed by the UE 10 will be described with reference to FIG. 10. The UE 30 detects its own positional information, and notifies the ProSe Server 90 of the detected position. The positional information may be notified using a case where new positional information is detected or a case where new positional information is obtained as its trigger, or the positional information may be notified using the start of the application or the start of the UE as its trigger. Hereinafter, an example in which the UE 10 obtains new positional information along with its own movement will be described. Although the UE 10C will be described in the following description, the same procedure may be used in the LE 10a.

Initially, the UE 10 obtains new positional information along with its own movement (S1002). Here, new connection information is, for example, information for identifying the WLAN base station, and may be an access point (AP) name. An AP may be connected to any one of the WLAN APa 72 and the WLAN APb 76. The new connection information may be obtained when the power of the UE 10 is newly turned on even though this UE 10 does not move, or may be obtained when this UE 10 is connected to a new AP due to the ON of the WLAN function.

The new connection information may be obtained by detecting that the SSID or the Realm is obtained from the WLAN (WLAN APa 72 or WLAN APb 76) in addition to detecting that the new AP name is obtained. The new connection information may be obtained by detecting that the eNB ID obtained from the eNB 45 or TAI obtained from the MME 40 are obtained. In this case, a plurality of new connection information items may be obtained.

When GPS information is obtained, the UE 10 may notify the ProSe Server 90 of the connection information. When the GPS information is obtained, the UE 10 does not necessarily notify the ProSe Server 90 of the connection information, but may notify the ProSe Server of the connection information every a predetermined period of time.

The UE 10 that determines to notify of the connection information discovers the ProSe Server 90, and ensures secure communication with the ProSe Server 90 (S1004). The UE 10 previously retains information for being connected to the ProSe Server 90. The UE 10 may be connected to the ProSe Server 90 via the eNB 45 or the WLAN (WLAN APa 72 or WLAN APb 76).

Here, for example, the secure communication being ensured means that communication is performed after connection authentication is performed by, for example, the ProSe Server 90 or a device within another core network, or a high-security communication path using IPSec is established and communication is performed through the established communication path. Another method for increasing security may be used.

Subsequently, the UE 10 that ensures the secure communication with the ProSe Server 90 notifies the ProSe Server of positional information of the UE 10 (S1006). Here, the positional information notified from the UE 10 may be the AP name obtained from the WLAN (WLAN APa 72 or WLAN APb 76), or may be the SSID or the Realm name. The positional information may be the eNB ID obtained from the eNB 45, or may be the TAI obtained from the MME 40. Positional information obtained using the GPS may be notified. When the plurality of new connection information items is obtained, the plurality of new connection items may be notified.

The ProSe Server 90 that is notified of the positional information of the UE 10 receives the positional information of the UE 10 from the UE 10, and updates the positional information of the UE (S1008). In this case, when the plurality of positional information items (any combinations of AP, SSID, Realm, eNB ID, TAI and GPS may be used) is received from the UE 10, the ProSe Server 90 may update the plurality of positional information items of the UE 90.

In the present embodiment, the positional information is updated within the ProSe Server 90. However, when the positional information is managed in a device different from the ProSe Server 90, the positional information may be updated in this device, and this device may be, for example, the HSS 50 managed by the mobile communication provider.

Figure 11:
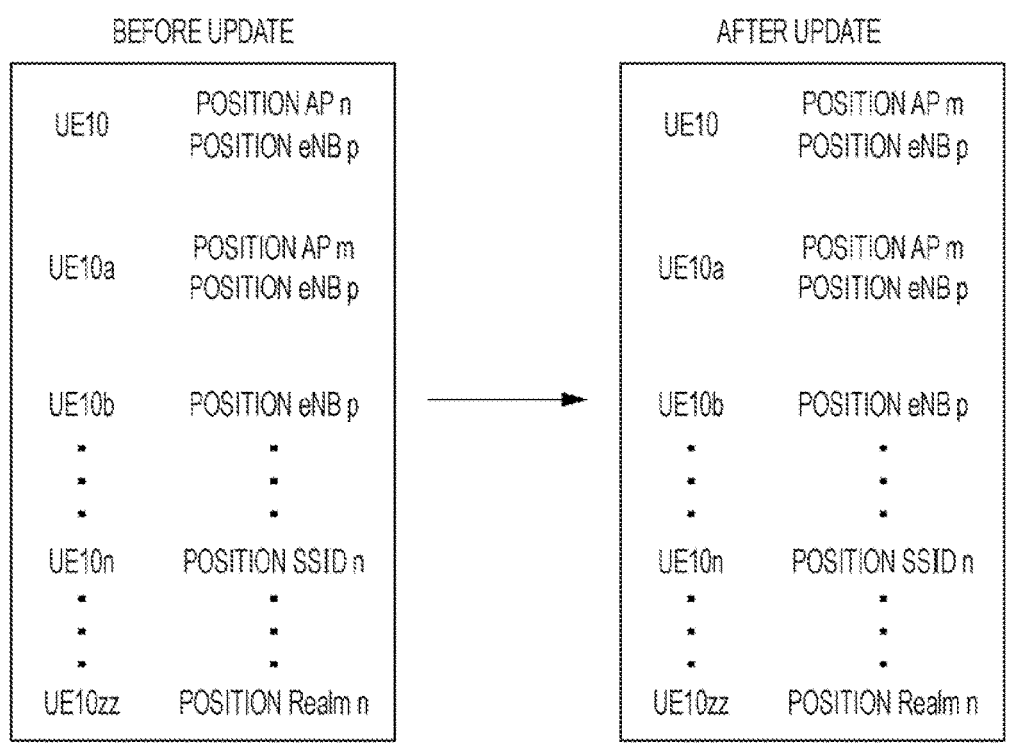
FIG. 11 is a diagram showing a case where positional information in the ProSe Server is updated.

FIG. 11 shows examples of the positional information management table 946 before and after the update is performed. Here, the UE 10 notifies the ProSe Server of AP m as the positional information. The AP m may be an AP name which is identification information of the WLAN base station.

A position AP n indicates that the AP name is AP n, and a position eNB p indicates that the eNB ID is eNB p. The eNB p may be an eNB ID which is identification information of the LTE base station. A position SSID m indicates that the SSID is SSID m. A position Realm n indicates that the Realm name is Realm n.

In the positional information management table 946 before the update is performed, the UE 10 is managed as being located in the position AP n and the position eNB p. The ProSe Server 90 changes the position AP n of the UE 10 to the position AP m based on the positional information from the UE 10.

When the positional information from the UE 10 is not received, the ProSe Server 90 determines that there are no proximity UEs capable of performing the transmission and reception of data through the ProSe. Here, the transmission and reception of data through the ProSe means the transmission and reception of data in the direct communication path between the UEs based on the LTE(D) or the WLAN (D).

[1.3.2 Proximity Discovery Unnecessary Procedure]

Figure 12:
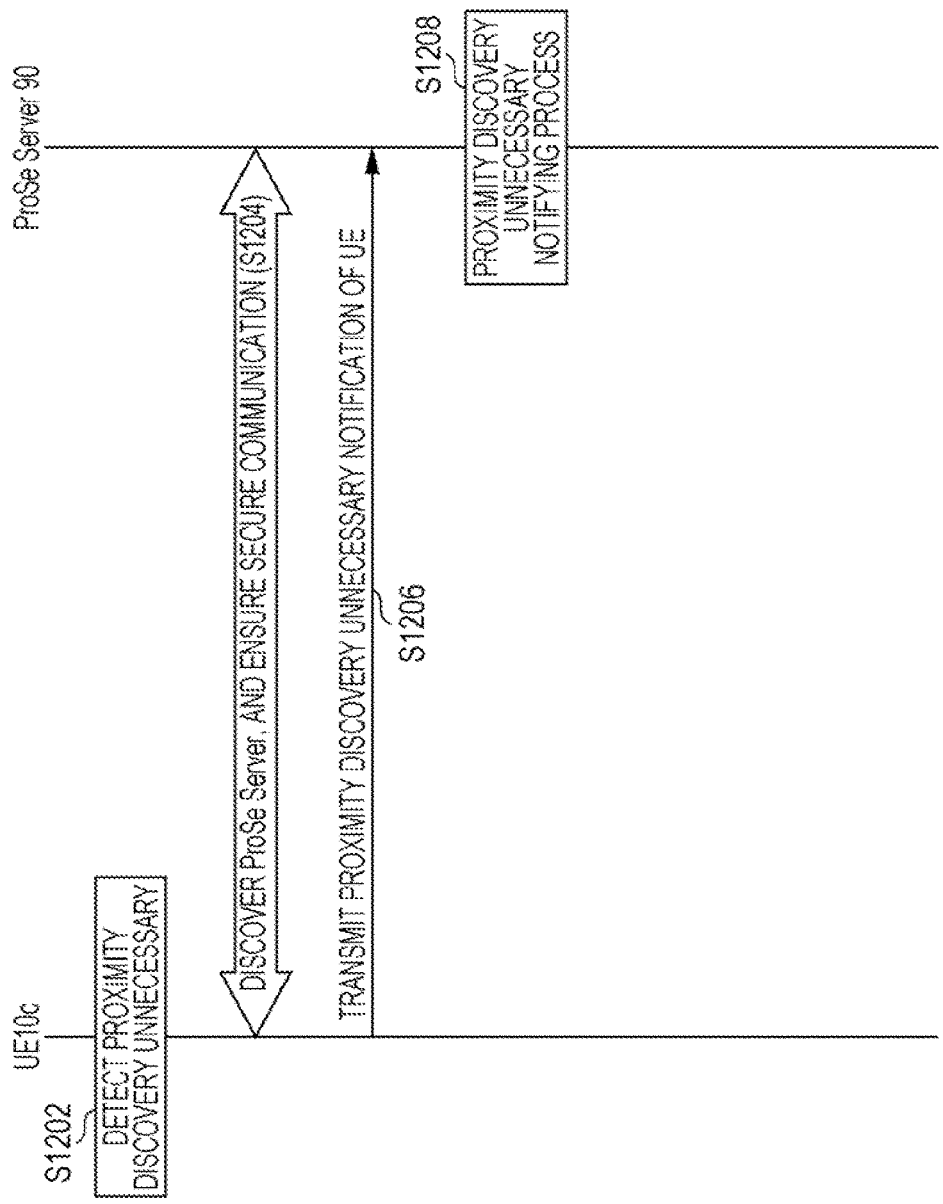
FIG. 12 is a diagram for describing a proximity detection unnecessary procedure according to the first embodiment.

Next, a proximity discovery unnecessary procedure will be described. The proximity discovery unnecessary procedure is performed in order for a certain UE not to be detected as a proximity UE by another UE. Here, a procedure example in which the UE 10*c* different from the UE 10 is not detected as a proximity UE of the UE 10 by the UE 10 will be described. The proximity discovery unnecessary procedure will be described with reference to FIG. 12. Initially, the UE 10*c* detects the proximity discovery unnecessary (S1202). Here, for example, the proximity discovery unnecessary may be configured such that the UE 10*c* is not detected by a specific UE through a terminal operation of the user, and may be detected based on the configuration.

The UE 10 that detects the proximity discovery unnecessary ensures the secure communication with the ProSe Server 90 (S1204). When secure communication means is already ensured, the UE 10 previously obtains information indicating the position of the ProSe Server 90, and thus, it is possible to detect the ProSe Server 90.

Here, for example, the secure communication being obtained means that communication is performed after connection authentication is performed by the ProSe Server 90 or a device within another core network, or a high-security communication path using IPSec is established and communication is performed through the established communication path. Another method for increasing security may be used.

Thereafter, the UE 10*c* transmits a proximity discovery unnecessary notification to the ProSe Server 90 (S1206). When another UE different from the UE 10*c* requests the detection of proximity UEs from the ProSe Server, the UE 10*c* requests the excluding of the UE 10*c* from a proximity detection target from the ProSe Server 90 by transmitting the proximity discovery unnecessary notification. In other words, the UE 10*c* refuses to be detected as the proximity terminal.

Here, the UE 10*c* may transmit a notification including information indicating the proximity discovery unnecessary, a specific application, and information for identifying a specific UE.

In the following description, an example in which the UE 10*c* transmits a notification including the information indicating the proximity discovery unnecessary, the APP 1 and the UE 10 will be described.

The ProSe Server 90 receives the proximity discovery unnecessary notification from the UE 10*c*, and performs a proximity discovery unnecessary notifying process based on the notified information (S1208). The ProSe Server 90 updates the contact lists such that the UE 10*c* is not discovered by another UE in the proximity discovery unnecessary notifying process.

Figure 13:
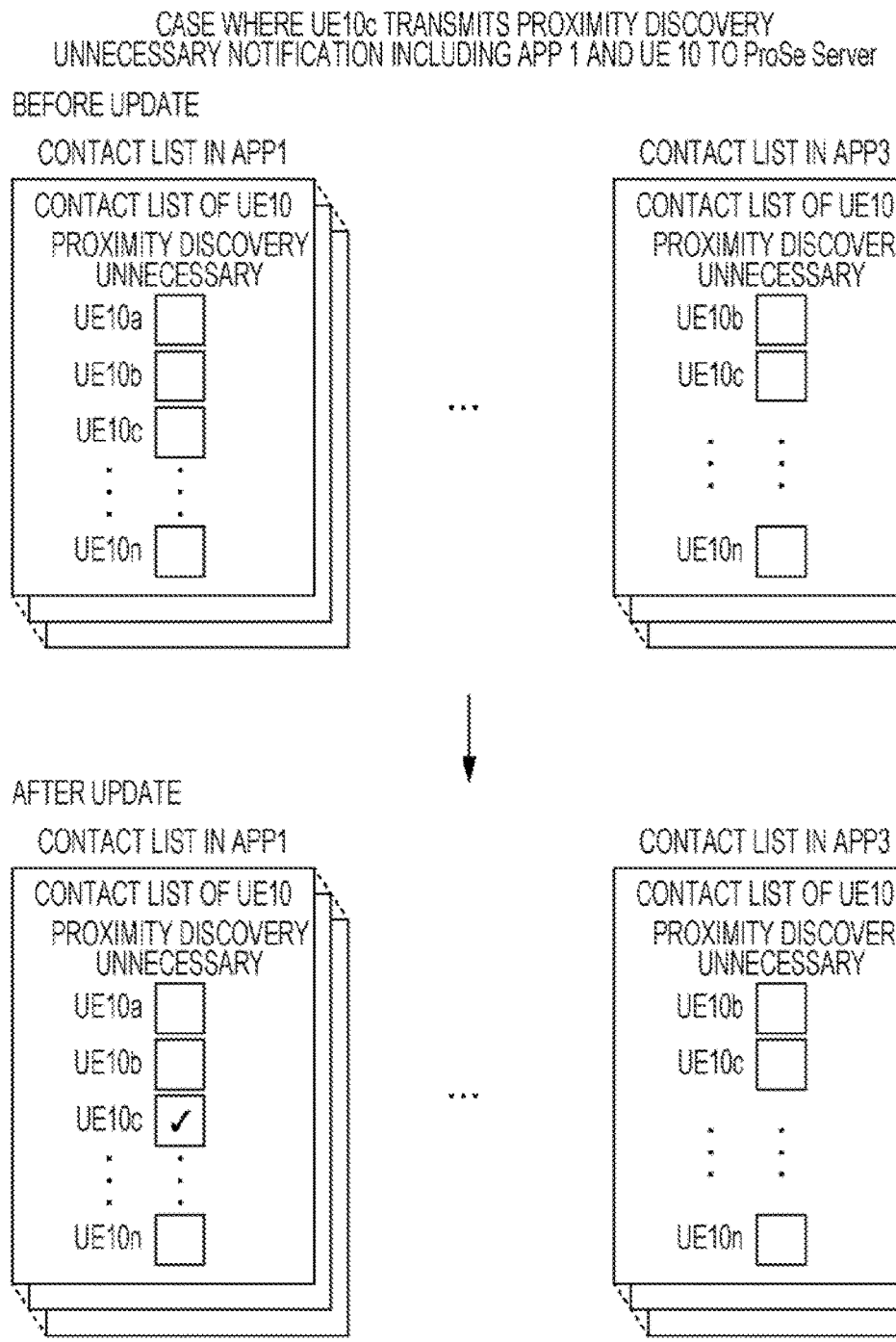
FIG. 13 is a diagram showing a case where the Server contact list based on the proximity detection unnecessary procedure is updated.

FIG. 13 shows an example of the update in the proximity discovery unnecessary notifying process. Here, an example in which the information indicating the proximity discovery unnecessary, the APP 1 and the UE 10 are received through the notification of the UE 10*c* will be described.

The ProSe Server 90 specifies the Server contact list 942 correlated with the APP 1 of the UE 10 based on the received information. As shown in FIG. 13, the update is performed by checking the proximity discovery unnecessary check box of the UE 10*c* in a non-update state in which the proximity discovery unnecessary check box of the UE 10*c* is not checked. Thus, when the UE 10 requests the detection of whether or not there is a proximity terminal that performs communication in the APP 1 from the ProSe Server 90, the ProSe Server 90 detects a proximity terminal by excluding the UE 10*c* from the target. That is, even though the UE 10*c* is positioned in the proximity of the UE 10, the UE 10*c* is not detected as the proximity terminal by the ProSe server 90.

When another UE different from the UE 10*c* requests the detection of the proximity UE from the ProSe Server 90, the UE 10*c* may request the including of the UE 10*c* in a proximity detection target from the ProSe Server 90 by transmitting the proximity discovery unnecessary notification. In other words, the UE 10*c* cancels the state in which the UE 10*c* refuses to be detected as the proximity terminal, and changes to a state in which the UE 10*c* permits to be detected as the proximity terminal.

Here, the UE 10*c* may transmit a notification including information indicating that the proximity discovery is permitted, a specific application, and information for identifying a specific UE.

The ProSe Server 90 receives the notification from the UE 10*c*, specifies the Sever contact list 942 in the same process as the process of configuring the proximity discovery necessary, and updates the Server contact list such that the UE 10*c* is included in the proximity discovery target by un-checking the check box based on the received information.

As stated above, UEs other than the UE 10*c* may request the excluding of the other UEs from the proximity discovery target, similarly to the UE 10*c*. Accordingly, the UE that requests the detection of the proximity UE requests the notification of information regarding the proximity UE among the UEs which do not want to be subjected to the proximity discovery. When the information regarding the proximity UE is requested from a certain UE, the ProSe Server 90 detects the proximity UE among the UEs which do not want to be subjected to the proximity discovery, and provides the information regarding the proximity UE.

Although it has been described in the present example that the UE 10c transmits the notification including the information indicating the proximity discovery unnecessary, the APP 1 and the information for identifying the UE 10, the UE 10c may transmit a notification including information the proximity discovery unnecessary and the APP 1.

In this case, the UE 10c does not refuse to be subjected to the proximity discovery by a specific UE, but the Server contact list 942 correlated with the APP 1 is configured such that the UE 10c is not subjected to the proximity discovery by all the UEs. Specifically, the ProSe Server 90 detects whether or not the UE 10c is included in the Server contact list 90 correlated with the APP 1 of all the UEs, and updates the Server contact list such that the UE 10c is not subjected to the proximity discovery by checking the check box correlated with the UE 10c.

The UE 10c may transmit a notification including information indicating the proximity discovery unnecessary and information for identifying the UE 10.

In this case, the Server contact lists 942 for the all applications correlated with the UE 10 are configured such that the UE 10c is not subjected to the proximity discovery. Specifically, all the Server contact lists 942 of the UE 10 are updated such that the UE 10c is not subjected to the proximity detection by detecting whether or not the UE 10c is listed and by checking the check box correlated with the UE 10c.

[1.3.3 Communication Path Establishment Procedure]
[1.3.3.1 Communication Path Establishment Procedure 1]

Next, a procedure until the transmission and reception of data through the direct communication is started after the proximity discovery is performed on the UE capable of performing the direct communication will be described. Hereinafter, an example in which communication between the UE 10 and the UE 10a is requested in the APP 1 and the usable communication path is the communication path based on the LTE(D) is detected will be described with reference to FIG. 14.

The UE 10 determines to start the transmission and reception of data to and from the UE 10a through the ProSe (1702). For example, this determination may be performed as a trigger when the direct communication is requested by the application that performs the direct communication with the UE 10a.

The UE 10 may establish the communication path based on the LTE(D) with the UE 10a based on the communication provider's approval for communication path establishment and the request for the detection of the proximity terminal. The UE 10 may establish the communication path based on the LTE(D) with the UE 10a based on the communication provider's approval for the communication path establishment or the request for the detection of the proximity terminal. The UE 10 receives the communication provider's approval for the communication path establishment, the request for the detection of the proximity terminal, the contact list, and the usable communication path, and can establish the direct communication path of the LTE(D) with the UE 10a by using the usable communication path and the contact list. Here, the contact list may be a list of the UEs (proximity terminals) located in proximity enough to perform the direct communication with the UE 10 within the Server contact list 942, or may be the Server contact list 942 itself.

As a method of requesting the communication provider's approval for the communication path establishment and the detection of the proximity terminal, the UE 10 may transmit a PDN connectivity request to the MME 40 based on a UE requested PDN connectivity procedure (S1704). Here, the UE 10 transmits the PDN connectivity request including the APN. The PDN connectivity request is a request transmitted to the MME 40 from the UE 10 in order to establish the PDN connection.

Here, when the approval for the communication path establishment and the information regarding the proximity terminal are received by previously transmitting the PDN connectivity request, the PDN connectivity request may not be transmitted. For example, the UE 10 may obtain the permission and the information regarding the proximity terminal based on the fact that the PDN connectivity request for the communication path establishment of the LTE(D) is previously transmitted when the terminal is started or the application is started, and may immediately establish the direct communication path without transmitting the PDN connectivity request when the UE 10 determines to start the communication with the UE 10a (S1723). Here, the UE 10 may establish the direct communication path with the UE other than the UE 10a, which is included in the information regarding the proximity terminal received together with permission information for the communication path establishment in the PDN connectivity request, in addition to starting the direct communication with only the UE 10a. When the UE 10 retains the APN correlated with the usable direct communication path, the usable communication path of the APP 1 is the LTE(D), and the approval for the establishment of the direct communication path of the LTE(D) and the detection of the proximity terminal are requested, the UE 10 selects the APN correlated with the LTE(D).

The APN managed in correlation with the direct communication path may be plural in number. For example, a plurality of different APNs such as an APN 1 correlated with the LTE(D), an APN 2 correlated with the WLAN(D), and an APN 3 correlated with a plurality of direct communication paths such as the LTE(D) and the WLAN(D) may be managed.

This means that the APN is managed in correlation with the permission information for the establishment of the direct communication path and the detection of the proximity terminal for the establishment of the correlated direct communication path is requested. For example, the APNs are managed such that the LTE(D) is permitted and the detection of the proximity terminal capable of performing the LTE(D) is requested in the APN 1, the WLAN(D) is permitted and the detection of the proximity terminal capable of performing the WLAN(D) is requested in the APN 2, and the direct communication paths of the LTE(D) and the WLAN(D) are permitted and the detection of the proximity terminal capable of performing the LTE(D) and the WLAN(D) is requested in the APN 3.

Here, the proximity terminal capable of using the LTE(D) is a list of the UEs located in proximity enough to use the LTE(D). The proximity terminal capable of using the LTE (D) may be one or plural in number. The proximity terminal capable of using the WLAN(D) is a list of the UEs located in proximity enough to use the WLAN(D). The proximity terminal capable of using the WLAN(D) may be one or plural in number. The proximity terminal capable of the LTE(D) and the WLAN (D) is a list of the UEs located in proximity enough to use the LTE(D) and the WLAN(D). The proximity terminal capable of the LTE(D) and the WLAN (D) may be one or plural in number.

an APN other than the APN which permits the establishment of the direct communication path and requests the detection of the proximity terminal, such as an APN 4 which does not permit the establishment of the direct communication path and does not request the detection of the proximity terminal, may be retained.

In order to request the permission for the establishment of the direct communication path of the LTE(D) and the detection of the proximity terminal from the MME 40, the UE 10 selects an APN which permits the LTE(D) and requests the detection of the proximity terminal among the plurality of APNs, and adds the selected APN to the PDN connectivity request. In the above example, the UE 10 can select the APN 1 or the APN 3. However, the UE may manage the application in correlation with the APN such that the APN 1 is used for the APP 1, and may select the APN based on the correlation information. Alternatively, the APN may be arbitrarily selected.

In the discovery of the communication target UE, the resolution of the IP address of the UE 10 may be performed. In order to perform the resolution of the IP address, the IP address of the UE 10a may be simultaneously included when the UE 10 receives a response from the UE 10a.

When the PDN connectivity request is transmitted to the MME 40 (S1704), the UE 1.0 adds the APN correlated with the usable communication path associated with the application to be used to the PDN connectivity request. Here, since the direct communication of the LTE(D) is used, the APN 1 is included in the PDN connectivity request.

The WLAN(D) may be established in any type of application. When the direct communication paths of both the LTE(D) and the WLAN(D) can be established, the UE 10 may arbitrarily determine any one of them, or may determine any one of them through the notification from the network.

Subsequently, the MME 40 receives the PDN connectivity request transmitted from the UE 10, and checks the APN included in the PDN connection. The checking of the APN is performed by determining that the received APN is an SAPN which permits the LTE(D) based on the permission information 442 for the establishment of the communication path and the proximity detection. Thus, the MME 40 detects that the UE 10 requests the permission for the establishment of the direct communication path based on the LTE(D) and the proximity detection.

The MME 40 manages the APN that can be used for each UE, and determines whether or not the UE 10 can use the APN notified from the UE 10. When it is possible to use the notified APN, the MME permits the establishment of the communication path correlated with the establishment of the direct communication path correlated with the APN and the proximity detection, and when it is not able to use the notified APN, the MME does not permit the communication path establishment and the proximity detection request.

Through the above procedure, the MME 40 can determine to permit the establishment of the direct communication path based on the LTE(D) and the proximity detection of the UE 10. Here, when the contact list and the permission for the establishment of the direct communication path are previously received and it is determined that it is possible to perform the direct communication, the detection of the proximity terminal and the approval for the communication path establishment by the communication provider may not be requested.

The MME 40 that permits the proximity detection and the establishment of the direct communication path correlated with the APN transmits a proximity detection request through the ProSe to the ProSe Server 90 (31706). In this case, the MME 40 adds an UE ID (UE 10) which is identification information of the UE 10 and communication path information indicating the direct communication of the LTE(D) to the proximity detection request to be transmitted to the ProSe Server 90.

Here, the ProSe Server 90 may obtain the communication path information by detecting information of the requested communication path, and the MME 40 may notify of the APN in place of the communication path information. For example, when the APN 1 is included, the MME 40 requests the contact list of the applications which permit the communication path of the LTE(D).

When the APN 2 is included, the MME 40 requests the contact list of the applications which permit the communication path of the WLAN(D). When the APN 3 is included, the MME 40 requests the contact list of the applications which permit the communication paths of the LTE(D) and the WLAN(D).

Thereafter, the ProSe Server 90 performs the proximity detection (S1708).

[1.3.3.1.1 Proximity Detection Process]

A proximity detection process for allowing the ProSe Server 90 to start the transmission and reception of data will be described. In the proximity detection process, it is detected whether or not the UE within the Server contact list 942 is positioned in the proximity of the UE 10. It may be detected whether or not the direct communication based on the LTE(D) or the WLAN(D) is performed.

Figure 15:
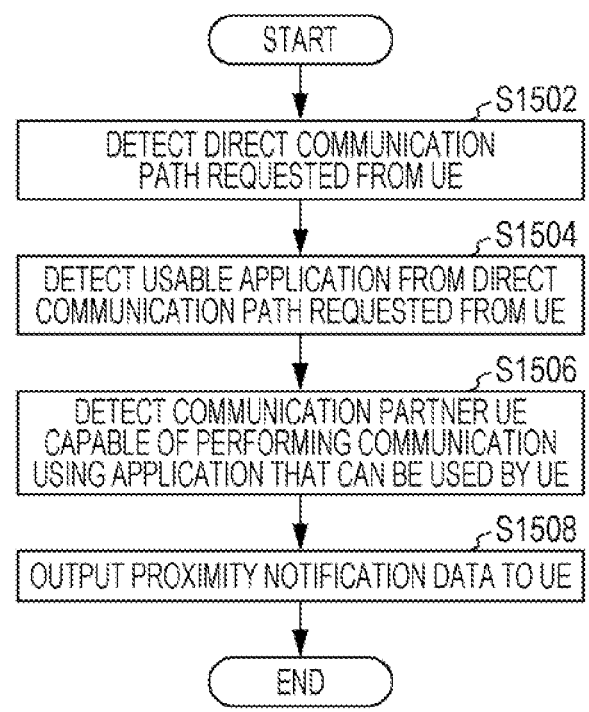
FIG. 15 is a diagram for describing a proximity detection process according to the first embodiment.

FIG. 15 shows an example of a procedure of the proximity detection process. In the present example, an example in which the MME 40 transmits the proximity detection request and the ProSe Server 90 performs the proximity detection process on the UE 10 based on the communication path information (LTE(D)) and the UE ID (UE 10) included in the proximity detection request will be described. Initially, the direct communication path requested by the UE 10 is detected (S1502). The ProSe Server 90 detects the communication path information (LTE(D)) and the UE ID (UE 10) included in the proximity detection request received from the MME 40. That is, the ProSe Server 90 detects that the UE 10 requests the direct communication of the LTE(D).

Here, the ProSe Server 90 may obtain the communication path information by detecting information of the requested communication path, or the ProSe Server 90 may detect the APN in place of the communication path information. For example, when the APN 1 is detected, the ProSe Server 90 detects that proximity information indicating that the communication path of the LTE(D) can be used is requested. When the APN 2 is detected, the ProSe Server 90 detects that proximity information which permits the communication path of the WLAN(D) is requested. When the APN 3 is detected, the ProSe Server 90 detects that proximity information which permits the communication path of the LTE (D) or the WLAN(D) is requested.

Subsequently, the ProSe Server 90 detects the usable application based on the direct communication path requested from the UE 10 (S1504). Here, in order to detect the application that can be used by the UE 10, the ProSe Server 90 may detect the application based on the communication path management table 944 for each application classification. The ProSe Server 90 may detect the usable application based on the direct communication path requested from the UE 10 based on the communication path management table 944 for each application classification.

Thus, the ProSe Server 90 can detect that the APP 1 can be used for the communication path of the Cat. 1 (LTE(D)), as the direct communication path that can be used by the UE 10. The ProSe Server 90 can detect that the APP 2 can be used for the communication path of the Cat. 2 (WLAN(D)). The ProSe Server can detect that the APP 3 can be used for the communication path of the Cat. 3 (LTE(D) and WLAN (D)).

Here, when there is a plurality of applications associated with the communication path included in the proximity detection request notified from the MME 40, the proximity information of the UE may be detected for each application.

Since the APP 3 is associated with the communication path of the Cat. 3, the APP 3 can perform the same direct communication of the LTE(D) as the Cat. 1. The ProSe Server 90 may detect the APP 3 as the application capable of using the LTE(D). As stated above, an application capable of using the same direct communication may be detected in a different Cat.

For example, when the application in the Cat. 2 is detected, since the APP 3 is associated with the communication path of the Cat. 3, it is possible to perform the same direct communication of the WLAN(D) as the Cat. 2. The ProSe Server 90 may detect the APP 3 as the application capable of using the WLAN(D).

Subsequently, the proximity UE of the UE 10 is detected based on the direct communication path and the application that can be used by the UE 10 detected in S1502 and S1504 (S1506). Here, in order to detect the UE as the communication partner that can communicate with the UE, the ProSe Server 90 may detect the UE by using the proximity detection policy 948, the positional information management table 946 and the Server contact list 942 of the UE 10.

For example, it may be determined whether or not the UE is located in proximity by extracting the UE 10, the positional information of the UE retained in the Server contact list 942 of the APP 1 of the UE 10, and the positional information of the UE 10 from the positional information management table 942 correlated with each UE and comparing the two extracted positional information items.

For example, as shown in FIG. 7B, the determination method based on the positional information may be performed by determining that two UEs are located in proximity enough to perform the communication based on the WLAN(D) since the two UEs are located in the same WLAN base station. The determination method may be performed by determining that two UEs are located in proximity enough to perform the communication based on the WLAN(D) since the two UEs are located in the WLAN base stations having the same SSID. The determination method may be performed by determining that two UEs are located in proximity enough to perform the communication based on the WLAN(D) since the two UEs are located in the WLAN base stations having the same Realm. The determination method may determine that two UEs are located in proximity enough to perform the communication based on the LTE(D) since the two UEs are located in the same LTE base station (eNB). When there is not any correspondence case, the determination method may be performed by determining that two UEs are separated at a distance enough to perform neither the communication based on the WLAN(D) nor the communication based on the LTE(D) (none).

As the example of the determination method, it has been described in the present example that the determination is performed using the information of the AP name, the SSID, the Realm or the eNB, but the determination method is not limited thereto. It may be detected that the UEs are in proximity using the GPS information, and it may be determine whether or not the communication based on the LTE(D) can be performed or the communication based on the WLAN (D) can be performed.

Here, when there is a plurality of applications associated with the communication path included in the proximity detection request notified from the MME 40, the proximity information of the UE may be detected for each application.

Since the APP 3 is associated with the communication path of the Cat. 3, it is possible to perform the direct communication of the LTE(D) and the WLAN(D). The ProSe Server 90 may detect the UE capable of using the LTE(D) in the APP 3. As mentioned above, a list of the UEs capable of using the same direct communication may be detected in a different application and a different Cat.

A specific example in which the ProSe Server 90 detects the proximity UE of the UE 10 (S1506) will be described. When the UE 10 requests the detection of the proximity UE capable of performing the communication in the LTE(D), the ProSe Server detects the direct communication path based on the request from the UE 10 (S1502). As described above, detection means detects that the communication is performed based on the LTE(D) on the detected communication path.

The ProSe Server 90 detects the usable application based on the direct communication path requested from the UE (S1504). As described above, detection means detects the APP 1 as the application capable of performing the communication based on the LTE(D) based on the usable application.

The UE located in proximity enough to perform the communication based on the detected application (APP 1) is extracted based on the Server contact list 942, the positional information management table 946 and the proximity detection policy 948. Specifically, the UE using the same LTE base station (eNB) as the positional information may be detected.

The detection of whether or not the UE notified as the proximity discovery unnecessary on the Server contact list 942 to the ProSe Server is in proximity is not performed. For example, in the state in which the contact list of the APP 1 in FIG. 13 is updated, the proximity discovery unnecessary checkbox of the UE 10c is checked. Thus, the detection of whether or not the UE 10c is in the proximity of the UE 10 is not performed.

In this case, since the communication path that can be used in the APP 1 is the communication based on the LTE(D), it is not necessary to determine whether or not there is the UE in proximity enough to perform the communication based on the WLAN(D).

In so doing, the ProSe Server 90 can detect that the UE 10 requests in the direct communication of the LTE(D) and the application that can be used by the UE 10 in the LTE(D) is the APP 1, and can detect the UE in proximity enough to perform the communication based on the LTE(D). The detected UE may be plural in number.

Here, since the application is associated with the Cat. 3 can use the LTE(D), the UE capable of using the LTE (D) may be detected in the application associated with the Cat. 3. That is, the UE capable of using the LTE(D) may be detected in the APP 3 associated with the Cat. 3.

Next, a specific example of the proximity detection in which the ProSe Server 90 detects the proximity UE of the UE 10 when the UE 10 requests the direct communication in the WLAN(D) (S506) will be described. The ProSe Server detects the direct communication path that can be used by the UE 10 based on the request from the UE 10 (S1502). As described above, detection means detects that the communication is performed based on the WLAN(D) based on the detected communication path.

The ProSe Server 90 detects the usable application based on the direct communication path requested from the UE (S1504). As described above, detection means detects the APP 2 as the application capable of performing the communication based on the WLAN (D) based on the detected application.

The UE in proximity enough to perform the communication based on the detected usable communication path (WLAN(D)) is extracted based on the Server contact list 942, the positional information management table 946 and the proximity detection policy 943. Specifically, the UE using the same WLAN base station as the positional information may be detected.

The detection of whether or not the UE notified as the proximity discovery unnecessary on the Server contact list 942 to the ProSe Server 90 is in proximity is not performed.

In this case, since the communication path that can be used in the APP 2 is the communication based on the WLAN(D), it is not necessary to determine whether or not there is the UE in proximity enough to perform the communication based on the LTE(D).

In so doing, the ProSe Server 90 can detect that the UE 10 requests the direct communication of the WLAN(D) and the application which can be used by the UE 10 in the WLAN (D) is the APP 2, and can detect the UE in proximity enough to perform the communication based on the WLAN(D). The detected UE may be plural in number.

Here, since the application associated with the Cat. 3 can use the WLAN(D), the UE capable of using the WLAN(D) may be detected in the application associated with the Cat. 3. That is, the UE capable of using the WLAN(D) may be detected in the APP 3 associated with the Cat. 3.

Next, a specific example in which the ProSe Server 90 detects the proximity UE of the UE 10 when the UE 10 requests the communication in the LTE(D) and the WLAN (D) (S1506) will be described. The ProSe Server 90 detects the direct communication path that can be used by the UE based on the request from the UE 10 (S1502). As described above, detection means detects that the communication is performed based on the LTE(D) and the WLAN(D) based on the detected communication path.

The ProSe Server 90 detects the application that can be used based on the direct communication path requested from the UE (S1504). As described above, detection means the APP 3 as the application capable of performing the communication based on the LTE(D) and the WLAN(D) based on the detected application.

The UE in proximity enough to perform the communication based on the detected usable communication path is extracted based on the Server contact list 942, the positional information management table 946 and the proximity detection policy 948. When the usable communication path is plural in number, for example, when the communication based on the LTE(D) is performed and the communication based on the WLAN(D) is performed, it is determined whether or not the respective UEs of the Server contact list 942 are in proximity enough to perform the communication based on the LTE(D), these UEs are in proximity enough to perform the communication based on the WLAN(D), these UEs in proximity enough to perform the communication based on the communication in both the LTE(D) and the WLAN(D), or these UEs are separated at a distance enough not to perform the communication in both the LTE(D) and the WLAN(D). As described above, determination means may perform the detection based on the positional information of the UEs.

The detection of whether or not the UE notified as the proximity discovery unnecessary on the Server contact list 942 to the ProSe Server 90 is in proximity is not performed. For example, in the state in which the contact list of the APP 1 in FIG. 13 is updated, the proximity discovery unnecessary check box of the UE 10c is checked. For this reason, it is not detected whether or not the UE 10c is in the proximity of the UE 10.

In so doing, the ProSe Server 90 can detect that the UE 10 requests the direct communication of the LTE(D) or the WLAN(D), and can detect the proximity UE communicating with the UE 10 through the APP 3 and the communication path that can be used for the proximity UE. The detected UE may be plural in number.

Here, when the direct communication of the LTE(D) and the WLAN(D) is requested, since the application associated with the Cat. 1 can use the LTE(D) and the application associated with the Cat. 2 can use the WLAN(D), the UE capable of using the LTE(D) or the WLAN(D) may be detected in the applications associated with the Cat. 1 and the Cat. 2. That is, the UE capable of using the LTE(D) may be detected in the APP 1 associated with the Cat. 1, and the UE capable of using the WLAN(D) may be detected in the APP 2 associated with the Cat. 2.

The usable communication path detected based on the positional information may be different for each proximity UE. For example, as shown in FIG. 16C, only the communication based on the LTE(D) can be used for the UE 10b, only the communication based on the WLAN(D) can be used for the UE 10d, and both the communication based on both the LTE(D) and the WLAN(D) can be used for the UE 10a. Here, when there is a plurality of applications associated with the communication path included in the proximity detection request notified from the MME 40, the proximity information of the UE may be detected for each application.

Through the above procedure, the ProSe Server 90 can output the result of S1506 as proximity notification data transmitted to the UE (S1508).

Referring back to FIG. 14, the ProSe Server 90 that completes the evaluation within the Server contact list 942 of the UE 10 in S1708 notifies the MME 40 of the contact list which is a list of the UEs located in proximity and information regarding the usable communication path, as a proximity detection response (S1710). For example, as shown in FIGS. 16A to 16C, the information regarding the proximity UE in the contact list and the usable communication path correlated with the proximity UE are transmitted to the MME 40. As shown in FIGS. 16A, 16B and 16C, the notification information transmitted to the UE 10 may be notified based on the permitted communication path. Here, in the examples of FIGS. 16A to 16C, FIG. 16A shows the notification information regarding the LTE(D) (APN 1), FIG. 16B shows the notification information regarding the WLAN(D) (APN 2), and FIG. 16C shows the notification information regarding the LTE(D) and the WLAN(D) (APN 3). Here, when there is a plurality of applications associated with the communication path included in the proximity detection request notified from the MME 40, the proximity information of the UE may be detected for each application.

Subsequently, the MME 40 transmits a bearer configuration request/PDN connection permission notification to the eNB 45 (S1720), and the eNB 45 transmits a RRC connection reconfiguration notification to the UE 10 based on the bearer configuration request/PDN connection permission notification (S1722). Thus, the MME 40 notifies the UE 10 that it is determined to permit the establishment of the direct communication path based on the LTE(D).

Here, the bearer configuration request/PDN connection permission notification and the RRC connection reconfiguration notification include the usable communication path and the Server contact list 942 included in the proximity detection response. Here, the Server contact list 942 may include only a list of the UEs located in the proximity of the UE 10 from the Server contact list 942. A flag such as ProSe Indicator which explicitly indicates that the establishment of the PDN connection between the PGW and the UE of the related art is not permitted and the establishment of the direct communication path and the proximity detection are permitted may be included in the bearer configuration request/PDN connection permission notification and the RRC connection reconfiguration notification.

The MME 40 may determine such that the session executed in the SGW 35 and the PGW 30 is not generated based on the APN. The MME may determine such that a generation procedure of the session executed in the SGW 35 and the PGW 30 is not performed by detecting that the establishment of the direct communication path and the proximity detection are requested based on the ProSe Indicator.

When it is determined not to generate the session, a session generation request (S1712) transmitted from the MME 40 to the SGW 35, a session generation request (S1714) transmitted from the SGW 35 to the PGW 30, a session generation response (S1716) transmitted from the PGW 30 to the SGW 35, and a session generation response (S1718) transmitted from the SGW 35 to the MME 40 as responses to these requests may not be transmitted and received.

As stated above, the MME 40 may select whether or not to generate the session within the core network depending on the APN that grants the permission, that is, establish the communication path such as the PDN connection.

The eNB 45 may determine whether or not to establish the wireless communication path with the UE 10 by including the ProSe Indicator. For example, the UE 10 may detect that the establishment requested from the UE 10 is the direct communication path between the UEs, and may not establish the wireless communication path including the allocation of the radio resource between the eNB 45 and the UE 10 based on this detection. The UE may detect that the establishment requested by the UE 10 is not the direct communication path between the UEs, and may establish the wireless communication path including the allocation of the radio resource between the eNB 45 and the UE 10 based on the detection.

Subsequently, the UE 10 receives the RRC connection reconfiguration notification from the eNB 45, and detects that the establishment of the communication path based on the LTE(D) is permitted. The detection may be performed by detecting that the Server contact list 942, the usable communication path and the ProSe Indicator are included.

Here, the Server contact list 942 is the list of the UEs capable of performing the direct communication, which is notified from the ProSe Server 90, and the usable communication path is the communication path that can be used for each UE included in the Server contact list 942.

Here, as shown in FIGS. 16A, 16B and 16C, the Server contact list 942 may notify the UE 10 of the notification information based on the permitted communication path. IN the examples of FIGS. 16A to 16C, FIG. 16A shows the notification information regarding the LTE(D) (APN 1), FIG. 16B shows the notification information regarding the WLAN(D) (APN 2), and FIG. 16C shows the notification information regarding the LTE(D) and the WLAN(D) (APN 3). Here, when there is a plurality of applications associated with the communication path included in the proximity detection request notified from the MME 40, the proximity information of the UE may be detected for each application. The MME 40 may notify the UE 10 of the bearer configuration request/PDN connection permission notification and the RRC connection reconfiguration notification including the information regarding the bearer ID or the IP address used by the UE 10 in order to perform the communication using the direct communication path or a frequency used for the direct communication.

In this case, the UE 10 may start the discovery of the UE as the communication target before the communication path based on the LTE(D) with the UE 10a is established (S1703). The discovery of the UE is performed by actually checking whether or not the communication path based on the LTE(D) is established with the UE 10a.

Even though the ProSe Server 90 notifies that the UE 10 is in proximity enough to establish the communication path based on the LTE(D) with the UE 10a, since it is not apparent that the communication path is actually established, the UE is discovered.

Specifically, the discovery of the proximity terminal is performed by transmitting broadcast information based on the frequency used in the LTE wireless access method to a proximity area, and the proximity terminal sends a response to the discovery of the proximity terminal. Among the responses from the proximity terminals which are received by the E 10, it may be detected that UE 10a is in proximity by detecting the response from the UE 10a.

Here, in the discovery of the communication target UE, the Server contact list 942 or the usable communication path notified from the eNB 45 may be used. The Server contact list 942 or the usable communication path is the UE list detected based on the positional information received from the UE in the ProSe Server 90. That is, since the ProSe Server 90 detects that there is the UE in proximity enough to perform the direct communication and performs the establishment procedure of the direct communication path, the UE 10 does not need to perform the establishment procedure of the direct communication path that is unnecessarily performed even though it is not able to perform the direct communication. Thus, it is possible to suppress the unnecessary procedure, the unnecessary terminal discovery process, and the resource regarding the terminal discovery.

The UE 10 that transmits the PDN connectivity request receives the RRC connection reconfiguration notification, and establishes the direct communication path with the UE 10a when the communication path establishment is permitted by the MME 40 (S1723). When the direct communication path establishment is not permitted, the establishment of the direct communication path may not be performed. The UE 10 determines whether or not to establish the direct communication path based on the direct communication path permitted by the MME 40 and the communication path correlated with the APN. Alternatively, the UE 10 may determine whether or not to establish the direct communication path based on any one of the direct communication path permitted by the MME 40 and the information regarding the communication path correlated with the APP associated with the Server contact list 942.

For example, when the direct communication path correlated with the APP 1 is the LTE(D) and the APN permitted by the MME 40 permits the establishment of both the LTE(D) and the WLAN(D), since the LTE(D) is correlated with the APP 1 and the LTE(D) is permitted by the APN, the UE 10 determines to establish the direct communication path of the LTE(D).

In the establishment procedure of the direct communication path based on the LTE(D) with the UE 10*a*, the UE 10 may establish the direct communication path using the frequency obtained from the RRC connection reconfiguration notification, or may establish the direct communication path by previously allocating a frequency to be used.

Here, the IP address or the bearer ID obtained from the RRC connection reconfiguration notification may be notified to the UE 10*a*, the notified IP address or bearer ID may be managed in correlation with the direct communication path, and the correlated IP address or bearer ID may be used at the time of performing the direct communication. At the time of establishing the direct communication path with the UE 10*a*, any one of the UE 10 and the UE 10*a* may allocate the IP address or the bearer ID and may notify the other one of the IP address or bearer ID, and the other one may obtain the notified IP address or bearer ID, may manage the obtained IP address or bearer ID in correlation with the direct communication path, and may use the IP address or bearer ID at the time of performing the direct communication.

Although it has been described in the present example that the establishment of the communication path is performed when the UE 10 starts the direct communication with the UE 10*a* by transmitting the PDN connectivity request by the UE 10, the present embodiment is not limited thereto, but the establishment of the communication path may be previously performed. For example, the UE 10 obtains the information regarding the proximity terminal and the permission for the direct communication path based on the fact that the PDN connectivity request for the establishment of the direct communication path of the LTE(D) is previously transmitted when the terminal is started or the application is started, and may immediately establish the direct communication path without transmitting the PDN connectivity request when the UE 10 is determined to start the direct communication with UE 10*a* (S1723). Here, the UE 10 may establish the direct communication path with the UE other than the UE 10*a* included in the information regarding the proximity terminal received together with the permission information for the communication path establishment in the PDN connectivity request in addition to starting the direct communication with only the UE 10*a*.

As discussed above, the UE 10 and the UE 10*a* can start the communication by establishing the direct communication path. When the communication path based on the LTE(D) is established for the communication of the APP 1, the UE 10 selects the direct communication path in order to transmit communication data of the APP 1, and transmits the communication data of the APP 1. More specifically, at the time of transmitting user data of the APN 14, the correlated IP address may be selected, and the communication may be performed. The correlated bearer ID may be selected, the communication path may be specified, and the communication may be performed. As for another application different from the APP 1, the communication is performed by establishing the connection with the PGW and selecting a communication path different from the direct communication path.

The UE 10 in which the establishment of the communication path of the LTE(D) with the UE 10*a* is completed may transmit a RRC reconfiguration completion notification to the eNB 45 (S1724). The eNB 45 may transmit the bearer configuration response to the MME 40 by checking that the UE 10 and the UE 10*a* establish the direct communication path of the LTE(D) (S1726).

As mentioned above, the UE 10 may notify the MME 40 that the establishment of the direct communication path is completed by transmitting the RRC reconfiguration completion notification and the bearer configuration response.

The RRC reconfiguration completion notification and the bearer configuration response may not be transmitted. For example, the UE 10 may determine to perform the transmission when the PDN connection between PGW 30 and the UE 10 of the related art is established, but may determine not to transmit when the direct communication path is established.

The UE 10 that completes the establishment of the communication path of the LTE(D) with the UE 10*a* may transmit a direct transfer message to the eNB 45 (S1728). The eNB 45 may transmit the PDN connection completion notification to the MME 40 based on the reception of the direct transfer message (S1730).

As stated above, the UE 10 may notify the MME 40 that the establishment of the direct communication path is completed by transmitting the direct transfer message and the PDN connection completion notification.

The RRC reconfiguration completion notification and the bearer configuration response may not be transmitted. For example, the UE 10 may determine to perform the transmission when the PDN connection between PGW 30 and the UE 10 of the related art is established, but may determine not to transmit when the direct communication path is established.

Here, when the PDN connection between the PGW 30 and the UE 10 of the related art is established, the MME 40 performs the procedure with respect to the SGW 35 and the PGW 30 after the bearer configuration response or the PDN connection completion notification is received, and updates the bearer configuration. Specifically, the MME 40 transmits a bearer update request to the SGW 35 (S1732), and the SGW 35 transmits the bearer update request to the PGW 30 based on the reception (S1734). The PGW 30 transmits a bearer update response to the SGW 35 as a response (S1736), and the SGW 35 transmits the bearer update response to the MME 40 based on the reception (S1738). Through the above procedure, bearer information is updated in each device.

Here, the MME 40 may not transmit the bearer update request by determining to perform the transmission when the PDN connection between the PGW 30 and the UE 10 of the related art is established or not to perform the transmission when the direct communication path is established. As mentioned above, the MME 40, the SGW 35 and the PGW 30 may not perform the update process of the bearer information when the direct communication path is established.

Through the above procedure, the UE 10 can detect the UE capable of using the direct communication (LTE(D) or WLAN(D)) from the Server contact list 942, and can determine to perform the proximity discovery. The proximity detection in the ProSe Server 90 can be performed based on the request for the detection of the proximity terminal of the UE 10, and can obtain the detection result as the UE 10*a*. Means for requesting the detection of the proximity terminal of the UE 10 can transmit the detection request of the proximity terminal by transmitting the PDN connectivity request.

As stated above, since the procedure of establishing the direct communication path is performed by detecting that there is the UE in proximity enough to perform the direct communication, the procedure of establishing the direct communication path that is unnecessarily performed even though it is not able to perform the direct communication with the UE 10 is not performed. Thus, it is possible to suppress an unnecessary procedure, an unnecessary terminal discovery process, and a resource regarding terminal discovery.

Although it has been described in the present example that the establishment of the communication path is performed when the UE 10 starts the communication with the UE 10a by transmitting the PDN connectivity request by the UE 10, the present embodiment is not limited thereto, but the establishment of the communication path may be previously performed. For example, the UE 10 obtains the information regarding the proximity terminal and the permission based on the fact that the PDN connectivity request for the establishment of the direct communication path of the LTE(D) is previously transmitted when the terminal is started or the application is started, and the UE 10 may immediately establish the direct communication path without transmitting the PDN connectivity request when it is determined to start the communication with the UE 10a (S1723). Here, the UE 10 may establish the direct communication path with the UE other than the UE 10a included in the information regarding the proximity terminal received together with the permission information for the establishment of the communication path in the PDN connectivity request, in addition to starting the direct communication with only the UE 10a.

Although it has been described in the above example that the communication path based on the LTE(D) in order to perform the communication through the APP 1 is established and the communication is started, the UE 10 can apply the aforementioned method to the communication through the APP 2 and the communication through the APP 3, as shown in FIG. 4A.

Fox example, when the communication of the APP 2 is performed, the UE 10 requests the permission for the establishment of the communication path of the WLAN(D) and the detection of the proximity terminal by selecting the APN which permits the WLAN(D) and requests the detection of the proximity terminal and adding the selected APN to the PDN connectivity request.

The UE 10 receives whether or not the establishment of the direct communication path of the WLAN(D) is permitted, receives the proximity terminal capable of using the WLAN(D) when the communication path establishment is permitted, and establishes the direct communication path of the WLAN(D).

When the MME 40 permits the establishment of the communication path based on the WLAN(D), information such as SSID for allowing the UE 10 and the UE 10a to perform the direct communication may be included.

When the communication of the APP 3 is performed, the PDN connectivity request including the APN which permits the LTE(D) and the WLAN(D) and requests the detection of the proximity terminal may be transmitted. Alternatively, after it is determined to use the LTE(D), the APN which permits only the LTE(D) and requests the detection of the proximity terminal may be selected, and the PDN connectivity request including the selected APN may be transmitted. Alternatively, after it is determined to use the WLAN (D), the APN which permits only the WLAN(D) and request the detection of the proximity terminal may be selected, and the PDN connectivity request including the selected APN may be transmitted.

As stated above, the UE 10 performs the establishment procedure after the permission for the request for the detection of the proximity terminal and the establishment of the direct communication path correlated with the application is requested to the mobile communication provider. The permission request is performed based on the information correlated with the direct communication path.

Thus, for example, when there is a plurality of applications correlated with the LTE(D) and the detection of the proximity terminal, the permission request may not be transmitted for each individual application.

For example, when the communication using the LTE(D) is permitted at the time of starting the communication of the APP 1 and the information regarding the proximity terminal is received, if the communication using the LTE(D) is performed by the application different from the APP 1, it is determined that the communication path establishment is already permitted, and the direct communication path may be established.

In order to perform the communication through the APP 3, the UE 10 may transmit the PDN connectivity request including the APN which permits the LTE(D) and the WLAN(D), and may establish the communication path with the UE by arbitrarily selecting the direct communication path of the LTE(D) or the direct communication path of the WLAN(D) when the establishment of the communication paths of both the LTE(D) and the WLAN(D) is permitted and the information regarding the proximity terminal is received.

Here, the UE 10 may establish the direct communication path with the UE other than the TUE 10a included in the information regarding the proximity terminal received together with the permission information for the establishment of the communication path in the PDN connectivity request, in addition to starting the direct communication with only the UE 10a.

In the UE 10a as the communication partner, the permission procedure based on the PDN connectivity request described above in order to obtain the permission of the communication provider at the time of establishing the direct communication path and requesting the detection of the proximity terminal may be performed.

Alternatively, the permission and proximity terminal detection procedure based on the PDN connectivity request may be performed when the establishment of the direct communication path is requested from the UE 10. That is, the completion of the permission procedure of the UE 10a as the communication partner at the time of establishing the direct communication path between the UE 10 and the UE 10a may be one condition for establishing the direct communication path and detecting the proximity terminal.

[1.3.3.2 Communication Path Establishment Procedure 2]

A method different from the method described in Communication Path Establishment Procedure 1 of 1.3.3.1 will be described as the procedure of performing the proximity discovery on the UE capable of performing the direct communication and starting to transmit and receive the data through the direct communication. In Communication Path Establishment Procedure 1 of 1.3.3.1, the procedure of requesting that the provider is to permit the proximity detection and the establishment of the direct communication path of the UE is performed based on the UE requested PDN connectivity procedure. Meanwhile, in the present example, the procedure of requesting that the provider is to permit the establishment of the communication path of the UE is performed based on a service request procedure. Communication Path Establishment Procedure 2 through the direct communication will be described with reference to FIG. 17.

In the present example, a procedure starting from a state in which the communication between the UE 10 and the UE 10*a* is requested in the APP 1, and it is detected that the usable communication path is the communication path based on the LTE(D) will be described.

Initially, the UE 10 determines to start the transmission and reception of data to and from the UE 10*a* through the ProSe (S1802). A specific determination method is the same as the method (S1702) in which the UE 10 determines to start the transmission and reception of data to and from the UE 10*a* through the ProSe in Communication Path Establishment Procedure 1 described with reference to FIG. 14, and thus, the description thereof will be omitted.

The UE 10 establishes the communication path based on the LTE(D) with the UE 10*a* based on the approval of the communication provider for the communication path establishment and the request for the detection of the proximity terminal. The UE 10 receives the contact list and the usable communication path as well as the approval of the communication provider for the communication path establishment and the request for the detection of the proximity terminal, and can establish the direct communication path such as the LTE(D) with the UE 10*a* by the contact list and the usable communication path. Here, the contact list may be a list of the UEs (proximity terminals) located in proximity enough to perform the direct communication with the UE 1.0 within the Server contact list 942, or may be the Server contact list 942 itself.

As a method of requesting the approval of the communication provider for the communication path establishment and the request for the detection of the proximity terminal, the service request may be transmitted to the eNB 45 based on the service request procedure of the UE (s1804). Here, the UE 10 transmits the service request by adding the APN to the service request.

In the procedure described herein, the service request may be transmitted in order for the UE 10 and the UE 10*a* to change from a connection standby state (idle) to a connected state.

The UE 10 that transmits the service request retains the APN correlated with the usable direct communication path, and when the usable communication path of the APP 1 is the LTE(D) and the UE 10 requests the approval for the establishment of the direct communication path of the LTE(D) and the detection of the proximity terminal, the APN correlated with the LTE(D) is selected.

The APN managed in correlation with the direct communication path may be plural in number. For example, a plurality of different APNs such as an APN 1 correlated with the LTE(D), an APN 2 correlated with the WLAN(D), and an APN 3 correlated with the plurality of direct communication paths such as the LTE(D) and the WLAN(D may be managed.

This means that the APN is managed in correlation with the permission information for the establishment of the direct communication path and the proximity terminal capable of performing the direct communication is requested. For example, the APNs are managed such that the LTE(D) is permitted and the detection of the proximity terminal capable of performing the LTE(D) is requested in the APN 1, the WLAN(D) is permitted and the detection of the proximity terminal capable of performing the WLAN(D) is requested in the APN 2, and the direct communication paths of the LTE(D) and the WLAN(D) are permitted and the detection of the proximity terminal capable of performing the LTE(D) and the WLAN(D) is requested in the APN 3.

Here, the proximity terminal capable of using the LTE(D) is a list of UEs located in proximity enough to use the LTE(D). The proximity terminal capable of using the LTE (D) may be one or plural in number. The proximity terminal capable of using the WLAN(D) is a list of UEs located in proximity enough to use the WLAN(D). The proximity terminal capable of using the WLAN(D) may be one or plural in number. The proximity terminal capable of using the LTE(D) and the WLAN(D) is a list of UEs located in proximity to use the LTE(D) and the WLAN(D). The proximity terminal capable of using the LTE(D) and the WLAN(D) may be one or plural in number.

The UE 10 may retain an APN other than the APN which permits the establishment of the direct communication path and the detection of the proximity terminal, such as an APN 4 which does not permit the establishment of the direct communication path and does not request the detection of the proximity terminal.

In order to request the permission for the establishment of the direct communication path of the LTE(D) and the detection of the proximity terminal in the LTE(D) from the MME 40, the UE 10 selects the APN which permits the LTE(D) and requests the detection of the proximity terminal, among the plurality of APNs, and adds the selected APN to the service request. In the above example, the UE 10 can select the APN 1 or the APN 3. However, the UE may manage the application in correlation with the APN such that the APN 1 is used for the APP 1, and may select the APN based on the correlation information. Alternatively, the APN may be arbitrarily selected.

In the discovery of the communication target UE, the resolution of the IP address of the UE 10*a* may be performed. In order to perform the resolution of the IP address, the IP address of the UE 10*a* may be simultaneously included when the UE 10 receives a response from the UE 10*a*.

When the service request is transmitted to the eNB 45 (S1804), the UE 10 adds the APN corresponding to the usable communication path associated with the application to be used to the service request. Here, since the direct communication of the LTE(D) is used, the UE 10 adds the APN 1 to the service request.

In any type of application, the WLAN(D) may be established. When both the LTE(D) and the WLAN(D) can be established, the UE 10 may arbitrarily determine the direct communication path, or may determine the direct communication path by using the notification from the network.

The eNB 45 receives the service request from the UE 10, and transmits the service request including the APN to the MME 40 (S1806). Accordingly, the UE 10 transmits the service request to the MME 40 through the eNB 45.

Subsequently, the MME 40 receives the service request transmitted from the eNB 45, and checks the included APN. The checking of the APN is performed by determining that the received APN is the APN which permits the LTE(D) based on the permission information 442 for the establishment of the direct communication path and the detection of the proximity terminal. Thus, the MME 40 detects that the UE 10 requests the permission for the establishment of the direct communication path based on the LTE(D) and requests the detection of the proximity terminal.

The MME 40 manages the APN that can be used for each UE, and determines whether or not the UE 10 can use the APN notified from the UE 10. When the UE 10 can use the APN, the MME permits the detection of the proximity terminal and the establishment of the communication path correlated with the establishment of the direct communication path correlated with the APN. Meanwhile, and the MME does not permit the communication path establishment and the detection of the proximity terminal when the UE 10 is not able to use the APN.

Through the above procedure, the MME 40 can determine to permit the establishment of the direct communication path based on the LTE(D) and the detection of the proximity terminal of the UE 10.

Here, the UE 10 may previously receive the contact list and the permission for the establishment of the direct communication path, and may not request the approval of the communication provider for the communication path establishment and the detection of the proximity terminal when it is determined that the direct communication can be performed.

Through the above procedure, the MME 40 can determine to permit the establishment of the direct communication path based on the LTE(D) and the detection of the proximity terminal of the UE 10.

The MME 40 that permits the establishment of the direct communication path correlated with the APN and the proximity detection transmits a proximity detection request through the ProSe to the ProSe Server 90 (S1808). In this case, the MME 40 adds a UE ID (UE 10) which is identification information of the UE 10 and communication path information indicating the direct communication of the LTE(D) to the proximity detection request, and transmits the proximity detection request to the ProSe Server 90. The ProSe Server 90 that receives the proximity detection request from the MME 40 detects the UE ID (UE 10) and the communication path information (LTE(D)) included in the proximity detection request. That is, the ProSe Server 90 detects that the direct communication of the LTE(D) is started by the UE 10.

Subsequently, the ProSE server 90 performs the proximity detection (S1810). Since the method of performing the proximity detection is the same as the method illustrated in S1708 of the first embodiment, and the description thereof will be omitted. The UE 10 detects the usable communication paths and the Server contact lists 942 of all the usable applications (APP 1 to APP 3). Here, since the direct communication of the LTE(D) is started, the UE 10 may detect only the application corresponding to the LTE(D).

Thereafter, the ProSe Server 90 notifies of the usable communication paths and the Server contact lists 942 evaluated in S1810, as the proximity detection response to the MME 40 (S1812). In this case, for example, the Server contact lists 942 and the usable communication paths are notified as in FIG. 16A to FIG. 16C described in the first embodiment.

When the MME 40 determines as the permission, the MME 40 transmits a context configuration request to the eNB 45 (S1814), and the eNB 45 transmits a radio bearer establishment request to the UE 10 based on the context configuration request (S1816). Thus, the MME 40 notifies the UE 10 that it is determined that the establishment of the direct communication path based on the LTE(D) is permitted.

Here, the context configuration request and the radio bearer establishment request include the usable communication path and the Server contact list 942 included in the proximity detection response. Here, the Server contact list 942 may include only the list of the UEs located in the proximity of the UE 10 from the Server contact list 942. A flag such as ProSe Indicator which explicitly indicates that the establishment of the bearer between the PGW and the UE of the related art is not permitted and the establishment of the direct communication path and the proximity detection are permitted may be included.

The eNB 45 may determine whether or not to establish the wireless communication path with the UE 10 by including the ProSe Indicator. For example, the UE 10 may detect that the establishment requested from the UE 10 is the direct communication path between the UEs, and may not establish the wireless communication path including the allocation of the radio resource between the eNB 45 and the UE 10 based on this detection. The UE may detect that the establishment requested by the UE 10 is not the direct communication path between the UEs, and may establish the wireless communication path including the allocation of the radio resource between the eNB 45 and the UE 10 based on the detection.

Subsequently, the UE 10 receives the radio bearer establishment request from the eNB 45, and detects that the establishment of the communication path based on the LTE(D) and the proximity detection are permitted. The detection may be performed by detecting that the Server contact list 942, the usable communication path and the ProSe Indicator are included in the notification.

Here, the Server contact list 942 is the list of the UEs capable of performing the direct communication, which is notified from the ProSe Server 90, and the usable communication path is the communication path that can be used for each UE included in the Server contact list 942.

The MME 40 may notify the UE 10 of the context configuration request and the radio bearer establishment request including the information regarding the bearer ID or the IP address used by the UE 10 in order to perform the communication using the direct communication path or a frequency used for the direct communication.

Although it has been described that the discovery of the communication target UE is started before the service request is transmitted (S1703), the discovery may be started after the radio bearer establishment request is received (S1803). Here, in the discovery of the communication target UE, the Server contact list 942 or the usable communication path notified from the eNB 45 may be used. The Server contact list 942 or the usable communication path is the UE list detected based on the positional information received from the UE in the ProSe Server 90.

That is, since the ProSe Server 90 detects that there are UEs in proximity enough to perform the direct communication and performs the establishment procedure of the direct communication path, the establishment procedure of the direct communication path which is unnecessarily performed even though the it is not able to perform the direct communication with the UE 10 is not performed, and thus, it is possible to suppress an unnecessary procedure, an unnecessary terminal discovery process, and a resource regarding the terminal discovery.

The UE 10 receives the radio bearer establishment request, and establishes the direct communication path with the UE 10*a* when the establishment of the communication path is permitted by the MME 40 (S1818). When the establishment of the communication path is not permitted, the establishment of the direct communication path may not be performed. The UE 10 determines whether or not to establish the direct communication path based on the communication path correlated with the APN and the direct communication path permitted by the MME 40. Alternatively, the UE 10 may determine whether or not to establish the direct communication path based on any one of the information regarding the communication path correlated with the APP associated with the Server contact list 942, and the direct communication path permitted by the MME 40.

For example, when the direct communication path correlated with the APP 1 is the LTE(D) and the APN permitted by the MME permits the establishment of both the LTE(D) and the WLAN(D), since the LTE(D) is the correlated with the APP 1 and the LTE(D) is permitted by the APN, the UE 10 determines to establish the direct communication path of the LTE(D).

In the establishment procedure of the direct communication path based on the LTE(D) with the UE 10*a*, the UE 10 may establish the communication path by using the frequency obtained from the RRC connection reconfiguration notification, or may establish the communication path by previously allocating a frequency to be used.

Here, the bearer ID or the IP address obtained from the RRC connection reconfiguration notification may be notified to the UE 10*a*, may be managed in correlation with the direct communication path, and may be used at the time of performing the direct communication. At the time of establishing the direct communication path with the UE 10*a*, any one of the UE 10 and the UE 10*a* may allocate the IP address or the bearer ID and may notify the other one of the IP address or bearer ID, and the other one may obtain the notified IP address or bearer ID, may manage the obtained IP address or bearer ID in correlation with the direct communication path, and may use the IP address or bearer ID at the time of performing the direct communication.

As mentioned above, the UE 10 and the UE 10*a* can start the communication by establishing the direct communication path. When the communication path based on the LTE(D) is established for the communication of the APP 1, the UE 10 selects the direct communication path in order to transmit communication data of the APP 1, and transmits the communication data of the APP 1. More specifically, at the time of transmitting user data of the APN 1, the correlated IP address may be selected, and the communication may be performed. The correlated bearer ID may be selected, the communication path may be specified, and the communication may be performed. As for another application different from the APP 1, the communication is performed by establishing the connection with the PGW and selecting a communication path different from the direct communication path.

The UE 10 that completes the establishment of the communication path of the LTE(D) with the UE 10*a* may transmit the context initialization completion notification to the MME 40 (S1820).

The UE 10 may notify the MME 40 that the establishment of the direct communication path is completed by transmitting the context initialization completion notification.

The UE 10 may not transmit the context initialization notification. For example, the UE 10 may determine to perform the transmission when the bearer between the UE and the PGW of the related art is established, and may determine not to perform the transmission when the direct communication path is established.

when the bearer between the UE 10 and the PGW 30 of the related art is established, after the context initialization completion notification is received, the MME 40 performs the procedure between the SGW 35 and the PGW 30, and updates the bearer configuration. Specifically, the MME 40 transmits a bearer update request to the SGW 35 (S1822), and the SGW 35 transmits the bearer update request to the PGW 30 based on the reception (S1824). The PGW 30 transmits a bearer update response to the SGW 35 (S1826), as a response, and the SGW 35 transmits the bearer update response to the MME 40 based on the reception (S1828). Through the above procedure, the bearer information is updated in each device.

Here, when the bearer between the PGW 30 and the UE 10 of the related art is established, the MME may determine to perform the transmission. Meanwhile, when the direct communication path is established, the MME may determine not to perform the transmission, and the MME 40 may not transmit the bearer update request. As stated above, when the direct communication path is established, the MME 40, the SGW 35, and the PGW 30 may not perform the update process of the bearer information.

Through the above procedure, the UE 10 can detect the UE capable of using the direct communication (LTE(D) or WLAN(D)) from the Server contact list 942, and can determine to perform the proximity discovery. The proximity detection in the ProSe Server 90 can be performed based on the request for the detection of the proximity terminal of the WE 10, and can obtain the detection result as the UE 10*a*. Means for requesting the detection of the proximity terminal of the UE 10 can transmit the detection request of the proximity terminal by transmitting the service request.

As stated above, since the procedure of establishing the direct communication path is performed by detecting that there is the UE in proximity enough to perform the direct communication, the procedure of establishing the direct communication path that is unnecessarily performed even though it is not able to perform the direct communication with the UE 10 is not performed. Thus, it is possible to suppress an unnecessary procedure, an unnecessary terminal discovery process, and a resource regarding terminal discovery.

Although it has been described in the present example that the transmission of the service request by the UE 10 is performed when the UE 10 starts the communication with the UE 10*a*, the present invention is not limited thereto, but the service request may be previously transmitted. For example, the UE 10 may previously obtain permission and information regarding the proximity terminal based on the transmission of the service request for the establishment of the communication path of the LTE(D) at the time of starting the terminal or at the time of starting the application, and may immediately establish the direct communication path when the UE 10 determines to start the communication with the UE 10*a* (S1818).

Here, the UE 10 may establish the direct communication path with the UE other than the UE 10*a*, which is included in the information regarding the proximity terminal received together with permission information for the communication path establishment in the service request, in addition to starting the direct communication with only the UE 10*a*.

Although it has been described in the above example that the communication is started by establishing the communication path based on the LTE(D) in order to perform the communication of the APP 1, the UE 10 can apply the aforementioned method to the communication of the APP 2 and the communication of the APP 3, as shown in FIG. 4A.

For example, when the communication of the APP 2 is performed, the UE 10 requests the permission for the establishment of the communication path of the WLAN(D) and the detection of the proximity terminal by selecting the APN which permits the WLAN(D) and requests the detection of the proximity terminal and adding the selected APN to the service request.

The UE 10 receives whether or not the establishment of the communication path of the WLAN(D) is permitted, receives the information regarding the proximity terminal when the establishment is permitted, and establishes the direct communication path of the WLAN(D).

When the establishment of the communication path based on the WLAN(D) is permitted and the detection of the proximity terminal is requested, the MME 40 may add information such as SSID for allowing the UE 10 and the UE 10a to perform the direct communication to the service request.

When the communication of the APP 3 is performed, the MME may transmit the service request by including the APN which permits the LTE(D) and the WLAN(D) and requests the detection of the proximity terminal. After it is determined to use the LTE(D), the MME may transmit the service request by selecting the APN which permits the LTE(D) and requests the detection of the proximity terminal. After it is determined to use the WLAN(D), the MME may transmit the service connection request by selecting the APN which permits the WLAN(D) and requests the detection of the proximity terminal.

As stated above, the UE 10 performs the establishment procedure after the permission of the mobile communication provider is obtained for the establishment of the direct communication path correlated with the application and the request for the detection of the proximity terminal. The request for the permission is performed based on the information correlated with the direct communication path. The request for the detection of the proximity terminal is detected based on the information correlated with the direct communication path. Thus, for example, when there is a plurality of applications correlated with the LTE(D) and the detection of the proximity terminal, the permission request may not be transmitted for each individual application.

For example, when the communication using the LTE(D) is permitted at the time of starting the communication of the APP 1 and the information regarding the proximity terminal is received, if the communication using the LTE(D) is performed by the application different from the APP 1, it is determined that the communication path establishment is already permitted, and the direct communication path may be established.

In order to perform the communication through the APP 3, the UE 10 may transmit the service request including the APN which permits the LTE(D) and the WLAN(D), and may establish the communication path with the UE by arbitrarily selecting the direct communication path of the LTE(D) or the direct communication path of the WLAN(D) when the establishment of the communication paths of both the LTE(D) and the WLAN(D) is permitted and the information regarding the proximity terminal is received.

Here, the UE 10 may establish the direct communication path with the UE other than the UE 10a included in the information regarding the proximity terminal received together with the permission information for the establishment of the communication path in the service request, in addition to starring the direct communication with only the UE 10a. The UE 10a as the communication partner may perform the permission procedure based on the service request described above in order to obtain the permission of the communication provider at the time of the request the detection of the proximity terminal and the establishment of the direct communication path.

Alternatively, the permission and proximity terminal detection procedure may be performed based on the service request when the establishment of the direct communication path is obtained from the UE 10. That is, at the time of establishing the direct communication path between the UE 10 and the UE 10a, the completion of the permission procedure of the UE 10a as the communication partner may be one condition for establishing the direct communication path and detecting the proximity terminal.

[1.3.5 Disconnection Procedure]

Figure 18:
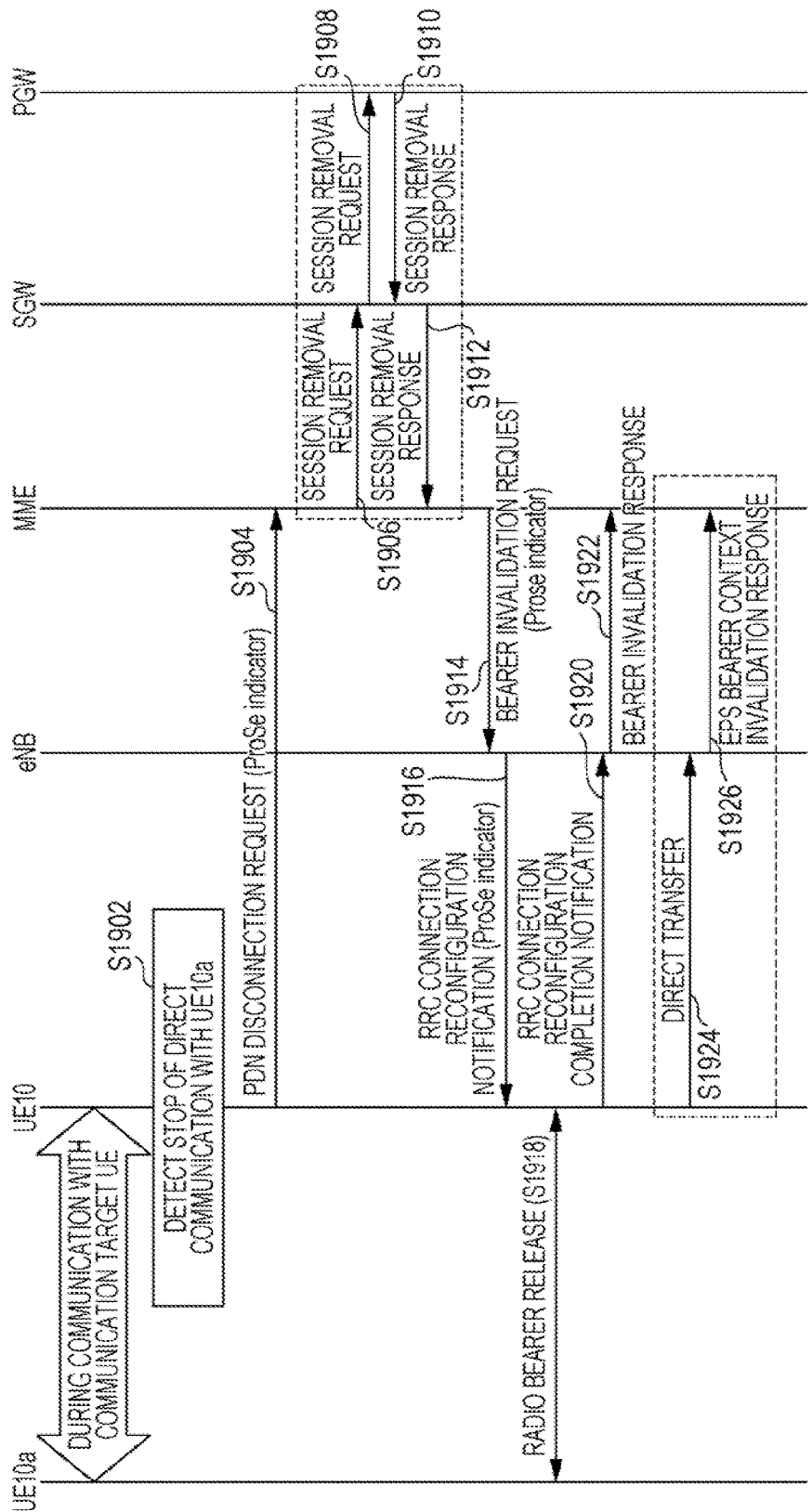
FIG. 18 is a diagram for describing a disconnection procedure of stopping direct communication according to the first embodiment.

In this section, a method of stopping the transmission and reception of data to and from the UE 10a through the ProSe during the communication through the direct communication path between the UE 10 and the UE 10a will be described. Here, the UE 10 is not changed to the idle state from the connected state with the UE 10a, and is changed from the connected state to a disconnected state from the UE 10a. The method of stopping the transmission and reception of data to and from the UE 10a through the ProSe will be described in conjunction with these cases with reference to FIG. 18. In the following description, the procedure of stopping the direct communication is started by detecting that the UE 10 stops the direct communication. Meanwhile, the UE 10a can perform the same procedure.

Initially, the UE 10 detects that the direct communication with the UE 10a is stopped (31902). Here, as the method of detecting the stopping of the direct communication, various methods are considered. For example, the detection may be performed when the transmission and reception of data to and from a direct communication partner is completed or when the distance between the UE 10 and the UE 10a increases and it is not able to maintain the direct communication.

Thereafter, the UE 10 that detects the direct communication with the UE 10a is stopped transmits a PDN disconnection request to the MME 40 (S1904). In this case, the UE may notify the PDN connection request including the ProSe Indicator.

The MME 40 may determine not to perform a procedure of removing the session executed in the SGW 35 and the PGW 30 based on the APN. The MME may detect that the PDN disconnection request is a request for establishing the direct communication path based on the ProSe Indicator, and may determine not to remove the session executed in the SGW 35 and the PGW 30.

When it is determined not to remove the session, a session removal request (S1906) transmitted to the SGW 35 from the MME 40, a session removal request (S1908) transmitted from the SGW 35 to the PGW 30, a session removal response (S1910) transmitted from the PGW 30 to the SGW 35, and a session removal response (S1912) transmitted from the SGW 35 to the MME 40 as responses thereof may not be transmitted and received.

As stated above, the MME 40 may select whether or not to remove the session within the core network depending on the APN that grants the permission, that is, remove the communication path such as the PDN connection.

Thereafter, the MME 40 transmits a bearer invalidation request to the eNB 45 (S1914). In this case, a bearer ID indicating a bearer associated with the direct communication may be included in the bearer invalidation request. A flag such as ProSe Indicator which explicitly indicates that the establishment of the PDN connection between the PGW and the UE of the related art is not permitted and the establishment of the direct communication path is permitted may be included in the bearer invalidation request.

The eNB 45 may determine to remove the wireless communication path with the UE 10 or release the resource by using the included ProSe Indicator. For example, the eNB may detect that the removal requested from the UE 10 is the direct communication path between the UEs, and may not remove the wireless communication path including the release of the radio resource between the eNB 45 and the UE 10 based on the detection. The eNB may detect that the removal requested from the UE 10 is not the direct communication path between the UEs, and may remove the wireless communication path including the release of the radio resource between the eNB 45 and the UE 10 based on the detection.

Subsequently, the eNB 45 transmits the RRC connection reconfiguration notification for the UE 10 to the UE 10 (S1916). In this case, a bearer ID indicating a bearer associated with the direct communication may be included in the RRC connection reconfiguration notification. A flag such as ProSe Indicator which explicitly indicates that the direct communication path is removed in addition to indicating that the establishment of the PDN connection is permitted between the UE and the PGW in the related art may be included in the RRC connection reconfiguration notification.

Subsequently, the UE 10 releases the radio bearer with the UE 10*a* (S191). In this case, the UE 10 may select whether or not to release the radio bearer based on the flag which explicitly indicates that the direct communication path or the bearer ID associated with the direct communication.

The UE 10 that releases the radio bearer with the UE 10*a* transmits the RRC connection reconfiguration completion notification to the MME 40 (S1920). The eNB 45 transmits the bearer invalidation response (S1922). Thereafter, the UE 10 transmits the direct transfer message to the eNB 45 (S1924). The eNB 45 transmits an EPS bearer context invalidation response to the MME 40 based on the reception of the direct transfer message (S1926).

Whether or not to transmit the RRC connection reconfiguration completion notification by the UE 10 may be selected based on whether or not remove the direct communication path. Similarly, whether or not to transmit the direct transfer message by the UE 10 may be selected based on whether or not to remove the direct communication path. For example, the UE 10 may determine to transmit the direct transfer message when the PDN connection between the PGW 30 and the UE 10 in the related art is removed, and may determine not to transmit the direct transfer message when the direct communication path is removed.

Through the above procedure, the UE can stop the direct communication with the communication target UE during the communication.

As discussed above, in the present embodiment, at the time of the discovery of the UE as the communication target, the UE as the communication source can detect whether or not the communication target UE is in proximity, can start the discovery of the communication target UE, and can suppress the waste of the power consumption.

When the UE starts the transmission and reception of data through the ProSe, even though the communication target UE is in the proximity of the communication source UE, if the communication source UE requests the transmission and reception of data through the LTE Direct and the communication target UE is not able to perform the transmission and reception of data through the LTE Direct, the communication source UE can suppress the power consumption by preventing unnecessary discovery from being started.

Through the ProSe, even though the communication target UE is in the proximity of the communication source UE, if the communication source UE requests the transmission and reception of data through the WLAN Direct and the communication target. UE is not able to perform the transmission and reception of data through the WLAN Direct, the communication source UE can suppress the power consumption by preventing the unnecessary discovery from being started.

When the UE as the communication target is in proximity, the communication through the ProSe is started. When the UE as the communication target is not in proximity, even though the communication via a macro is started, it is possible to prevent the communication source UE from randomly discovering the communication target UE, it is possible to reduce the time necessary to detect that the UE as the communication target is not in proximity, and it is not able to cause the delay until the communication via a macro is started.

The UE can discover the UE as the communication target by configuring the condition for discovering the proximity, and can start the ProSe.

[1.4 Modification Example]

[1.4.1 Modification Example 1]

The UE 10 notifies the PDN connectivity request in Communication Path Establishment Procedure 1 according to the first embodiment including the APN, but may notify the type of the application in addition to the APN. Since the type of the application is included, the ProSe Server 90 can perform the proximity detection of only the notified application, as the proximity detection result, and can reduce the information amount to be notified by notifying of the Server contact list 942 and eh usable communication path of only the notified application.

Figure 14:
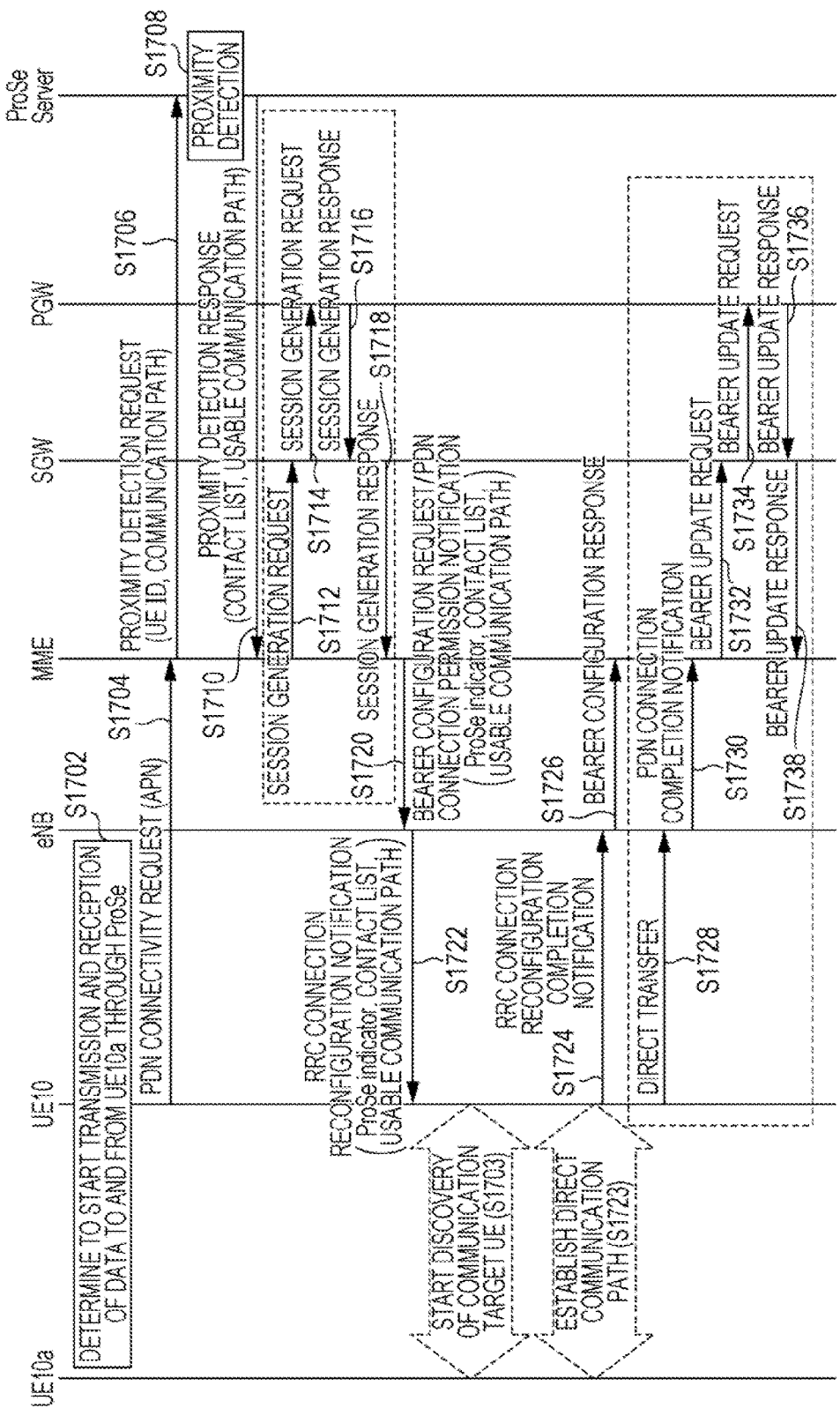
FIG. 14 is a diagram for describing a communication path establishment procedure based on a PDN connectivity request according to the first embodiment.

A specific procedure will be described with reference to FIG. 14. As described above, in the present example, the UE 10 detects the UE positioned in proximity enough to perform the communication by using the APP 1. The information regarding the usable direct communication path is obtained. In the present example, a procedure starting from in the state in which the UE 10 detects the UE 10*a* as the UE positioned in proximity and it is detected the usable communication path is the communication path based on the LTE(D) based on the notification from the ProSe Server 90 will be described.

Initially, the UE 10 determines to start the transmission and reception of data to and from the UE 10*a* through the ProSe (S1702). A specific determination method is the same as the method (S1702) in which the UE 10 determines to start the transmission and reception of data to and from the UE 10*a* through the ProSe in Communication Path Establishment Procedure 1 described with reference to FIG. 34, and thus, description thereof will be omitted.

Subsequently, since the PDN connectivity request is transmitted to the MME 40 (S1704), the UE 10 adds the APN corresponding to the usable communication path associate with the usable application to the PDN connectivity request. Here, since the communication is the direct communication of the LTE(D), the UE 10 adds the APN 1 to the PDN connectivity request. The UE 10 may add the information indicating the APP 1 as the type of the requested application to the PDN connectivity request.

The WLAN(D) may be established in any type of application. When both the LTE(D) and the WLAN(D) can be established, the UE 10 may arbitrarily determine any one of the LTE(D) and the WLAN(D). The APP 1 as the information indicating the type of the requested application may be included.

Subsequently, the MME 40 receives the PDN connectivity request transmitted from the UE 10, and checks the APN and the type (APP 1) of the application included in the PDN connection. The checking of the APN is performed by determining that the APN received based on the permission information 442 for the communication path establishment is the APN which permits the LTE(D) and the proximity detection. Thus, the MME 40 detects that the UE 10 requests the permission for the establishment of the direct communication path based on the LTE(D) and the proximity detection.

The MME 40 manages the APN that can be used for each UE, and determines whether or not the UE 10 can use the APN notified from the UE 10. When the UE 10 can use the APN, the MME permits the establishment of the communication path correlated with the establishment of the direct communication path correlated with the APN, and when the UE 10 is not able to use the APN, the MME does not permit the communicational path establishment and the proximity detection.

Through the above procedure, the MME 40 can determine to permit the proximity detection and the establishment of the direct communication path based on the LTE(D) of the UE 10.

The MME 40 that permits the proximity detection and the establishment of the direct communication path correlated with the APN transmits the proximity detection request through the ProSe to the ProSe Server 90 (S1706). In this case, the MME 40 adds a UE ID (UE 10) which is identification information of the UE 10 with respect to the ProSe Server 90, communication path indicating the direct communication of the LTE(D), and information indicating the type (APP 1) of the application to the proximity detection request.

Subsequently, the ProSe Server 90 performs the proximity detection (S1708). This modification example has a difference from the first embodiment in that the ProSe Server 90 detects the type (APP 1) of the application, and can detect the Server contact list 942 and the usable communication path of only the detected APP 1 as the proximity detection result. Here, in the proximity detection process shown in FIG. 1.5, a timing when the type of the application is used may be S1504, S1506 or S1508. After the result of the proximity detection process of FIG. 15 is detected, the type (APP 1) of the application may be used.

The ProSe Server 90 notifies the MME 40 of the usable communication path and the Server contact list 942 evaluated in S1708 as the proximity detection response (S1710). Here, this modification example has a difference from the first embodiment in that the type of the application is limited, and the information amount of the usable communication path and the Server contact list 942 to be notified can be reduced.

Subsequently, the MME 40 transmits the bearer configuration request/PDN connection permission notification to the eNB 45 (S1720), and the eNB 45 transmits the RRC connection reconfiguration notification to the UE 10 based on the bearer configuration request/PDN connection permission notification (S1722). Thus, the MME 40 notifies the UE 10 that it is determined to permit the establishment of the direct communication path based on the LTE(D) and the proximity detection.

The subsequent procedure of S1712 to S1718, S1703, and S1723 to S1738 is the same as that of the first embodiment, and thus, the description thereof will be omitted.

Through the above procedure, the UE 10 can detect the UE capable of using the direct communication (LTE(D) or WLAN(D)) from the Server contact list 942 in the application classification included in the PDN connectivity request, and can determine to perform the proximity discovery.

As discussed above, the UE 10 and the UE 10*a* can start the communication by establishing the direct communication path. The ProSe Server 90 can notify the Server contact list 942 and the usable communication path by limiting the type of the application, and can reduce a load of the network.

[1.4.2 Modification Example 2]

In Communication Path Establishment Procedure 2 according to the first embodiment, the UE 10 notifies the service request including the APN, but the type of the application may be notified. The ProSe Server 90 can perform the proximity detection of only the notified application, as the proximity detection result, by including the type of the application, and can reduce the information amount to be notified by notifying the usable communication path and the Server contact list 942 of only the notified application. In Modification Example 1 of 1.4.2, the procedure of requesting the permission of the provider for the proximity detection and the establishment of the direct communication path of the UE is performed based on the UE requested PDN connectivity procedure, but in the present example, the requesting procedure is performed based on the service request procedure.

Figure 17:
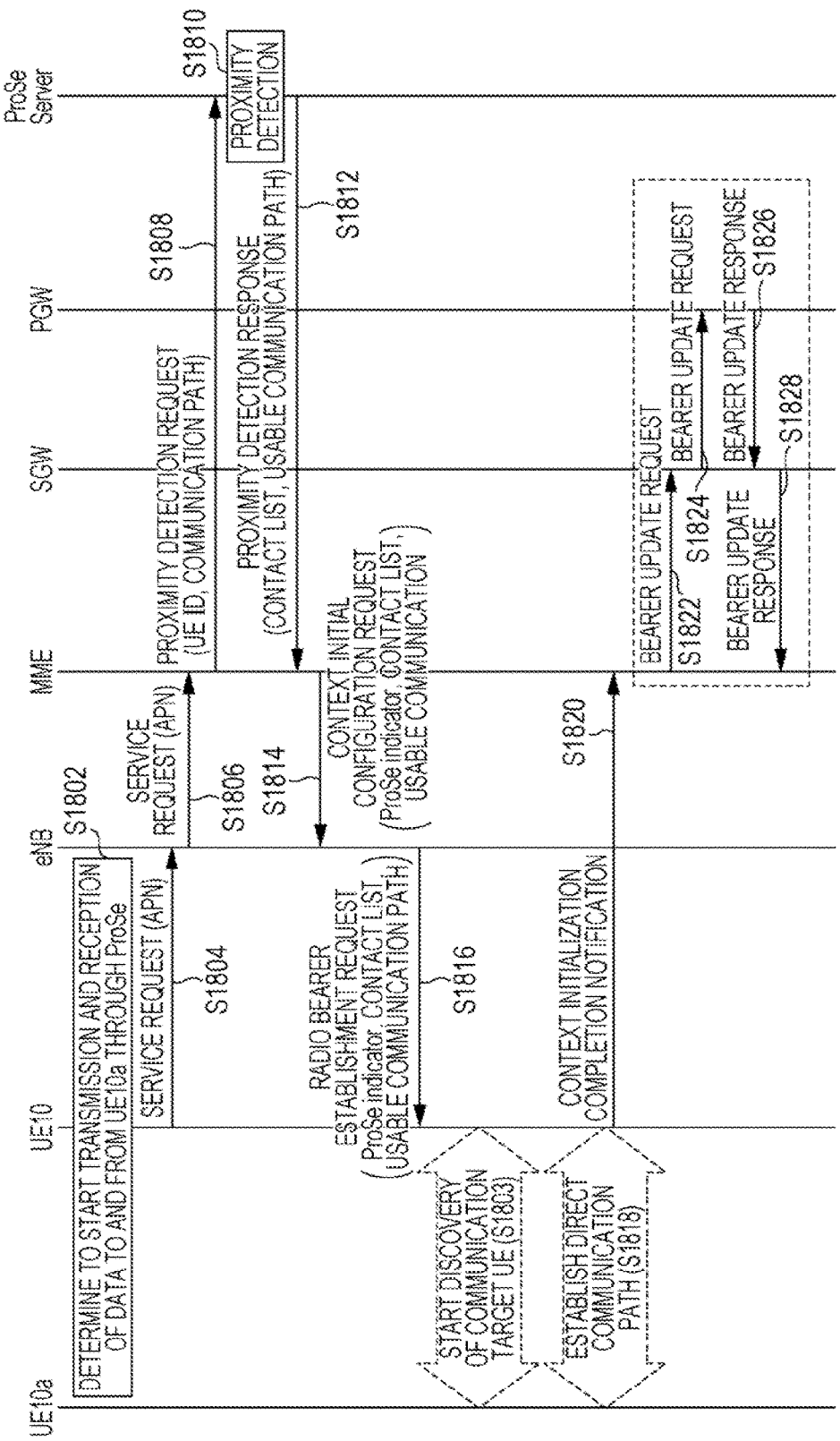
FIG. 17 is a diagram for describing a communication path establishment procedure based on a service request according to the first embodiment.

A specific procedure will be described with reference to FIG. 17. In the present example, a procedure in which the communication between the UE 10 and the UE 10*a* is requested in the APP 1 and it is detected that the usable communication path is the communication path based on the LTE(D) will be described.

Initially, the UE 10 determines to start the transmission and reception of data to and from the UE 10*a* through the ProSe (S1802). A specific determination method is the same as the method (S1702) in which the UE 10 determines to start the transmission and reception of data to and from the UE 10*a* through the ProSe in Communication Path Establishment Procedure 1 described with reference to FIG. 14.

Subsequently, when the service request is transmitted to the MME 40 (S1304), the UE 10 adds the APN correlated with the usable communication path associated with the application to be used to the service request. Here, since the direct communication of the LTE(D) is performed, the APN 1 is included in the service request. The information indicating the type of the requested application is included in the service request.

The WLAN(D) may be established in any type of application. When both the LTE(D) and the WLAN(D) can be established, the UE 10 may arbitrarily determine any one of them, or may determine any one of them by the notification from the network. The information indicating the type of the requested application is included in the service request.

Thereafter, the MME 40 receives the service request transmitted from the UE 10, and checks the APN and the type of the application included in the service request. The checking of the APN is performed by determining that the APN received based on the permission information 442 for the communication path establishment is the APN which permits the LTE(D). Thus, the MME 40 detects that the UE 10 requests the permission for the establishment of the direct communication path based on the LTE(D) and the proximity detection.

The MME 40 manages the APN that can be used for each UE, and determines whether or not the UE 10 can use the APN notified from the UE 10. When the UE 10 can use the APN, the MME permits the establishment of the communication path correlated with the establishment of the direct communication path correlated with the APN, and when the UE 10 is not able to use the APN, the MME does not permit the communication path establishment and the proximity detection.

Through the above procedure, the MME 40 determines to permit the UE 10 to permit the establishment of the direct communication path based on the LTE(D) and the proximity detection.

Thereafter, the MME 40 that permits the proximity detection and the establishment of the direct communication path correlated with the APN transmits the proximity detection request to the ProSe Server 90 through the ProSe (S1806). In this case, the MME 40 adds the UE ID (UE 10) which is the identification information of the UE 10 with respect to the ProSe Server 90, the communication path information indicating the direct communication of the LTE(D, and the information (APP 1) indicating the type of the application to the proximity detection request.

Subsequently, the ProSe Server 90 performs the proximity detection (S1810). Here, the proximity detection process is the same as S1708 of Modification Example 1 of 1.4.1, and thus, the description thereof will be omitted.

Referring again to FIG. 17, the ProSe Server 90 notifies the MME 40 of the usable communication path and the Server contact list 942 evaluated in S1708, as the proximity detection response (S1812). Here, the present modification example has a difference from the first embodiment in that the information amount of the usable communication path and the Server contact list 942 to be notified can be reduced by limiting the type of the application.

Through the above procedure, the UE 10 can determine to perform the proximity discovery by detecting the UE capable of using the direct communication (LTE(D) or WLAN(D)) from the Server contact list 942.

Thereafter, the MME 40 transmits the context initialization configuration request to the eNB 45 (S1814), and the eNB 45 transmits the radio bearer establishment request to the UE 10 based on the context initialization configuration establishment request (S1816). Thus, the MME 40 notifies the UE 10 that it is determined to permit the establishment of the direct communication path based on the LTE(D) and the proximity detection.

The subsequent procedure from S1818 to S1828 is the same as the procedure of the first embodiment, and the description thereof will be omitted.

As described above, the UE 10 and the UE 10a can start the communication by establishing the direct communication path. The ProSe Server 90 can notify of the Server contact list 942 and the usable communication path by limiting the type of the application, and can reduce the load of the network.

[1.4.3 Modification Example 3]

The UE according to the first embodiment manages the UE contact list 144 for each application, but may manage one UE contact list 144 for each UE without managing the UE contact list 144 for each application. FIG. 19 shows an example of the UE contact list 144 managed for each UE. As shown in FIG. 19, the UE 10 manages one UE contact list 144. Similarly to the first embodiment, the proximity discovery may not be performed using the proximity discovery unnecessary check box.

Since the UE 10 retains one UE contact list 144, the ProSe Server 90 manages the Server contact list 942 for each UE. FIG. 20 shows an example of the Server contact list 942 managed by the ProSe Server. As shown in FIG. 20, the ProSe Server 90 manages one Server contact list 942 for each UE.

The mobile communication system or the IP mobile communication network has the same configuration except for the above description. The UEs have the same configuration except for the UE contact list 144, and the ProSe Server 90 has the same configuration except for the Server contact list.

The UE positional information notification procedure, the proximity detection unnecessary notification procedure, the proximity detection procedure, the communication path establishment procedure, and the disconnection procedure can be similarly used, and thus, the description thereof will be omitted.

Thus, even when the UE 10 can use the plurality of applications, it is not necessary to have a different contact list for each application, and it is possible to share the same contact list by the plurality of applications.

[1.4.4 Modification Example 4]

Although it has been described that the UE 10 according to the first embodiment facilitates (turns ON) both the function of the LTE(D) and the function of the WLAN(D), the UE 10 may consider the ON or OFF of the function of the LTE(D) or the ON or OFF of the function of the WLAN(D). The UE considers the ON or OFF of the function of the LTE(D) or the ON or OFF of the WLAN(D), and thus, the ProSe Server 90 can include the ON or OFF state of the LTE(D) or the ON or OFF state of the WLAN(D).

FIG. 21A shows an example of the ON or OFF of the LTE(D) in which the UE 10 manages the ON or OFF state of the LTE(D). In FIG. 21A, the ON or OFF state of the LTE(D) is turned on.

FIG. 21B shows an example of the ON or OFF of the WLAN(D) in which the UE 10 manages the ON or OFF state of the WLAN(D). In FIG. 21B, the ON or OFF state of the WLAN(D) is turned on.

FIG. 22 shows an example of the contact list of the Server contact list 942 in which the ON or OFF states of the LTE(D) and the WLAN(D) are managed in the ProSe Server 90. Since the LTE(D) and the WLAN(D) are turned on in the UE 10, the ON or OFF states of the LTE(D) and the WLAN(D) are managed in the contact list of the UE 10. Here, if the state of the LTE(D) is turned off in the UE 10, the state of the LTE(D) of the contact list of the UE 10 within the Server contact list 942 may be turned off, or the state of the LTE(D) may not be managed. If the state of the WLAN(D) is turned off in the UE 10, the state of the WLAN(D) of the contact list of the UE 10 within the Server contact list 942 may be turned off, or the state of the WLAN(D) may not be managed. In the UE 10b, the state of the LTE(D) is turned on, the state of the WLAN(D) is turned off.

FIG. 23 shows an example in which the UE positional information of S1008 in "1.3.1 UE Positional Notification Procedure" is updated. Here, an updating example when UE 10b notifies the OFF state of the LTE(D) is illustrated. The LTE(D) of the UE 10b is changed from the ON state to the OFF state before the update and after the update. Here, the ON or OFF state of the LTE(D) is changed. However, when the ON or OFF state of the WLAN(D) is notified from the UE, the ON or OFF state of the WLAN(D) may be changed, and when the ON or OFF state of the LTE(D) and the ON or Off state of the WLAN(D) are notified, the ON or OFF state of the LTE(D) and the ON or OFF of the WLAN(D) may be changed.

Not the UE positional information of S1008 in "1.3.1 UE Positional Notification Procedure" but the ON or OFF state of the LTE(D) and/or WLAN(D) may be updated using the proximity discovery unnecessary notifying process of S1208 in "1.3.2 Proximity Discovery Unnecessary Procedure".

The mobile communication system or the IP mobile communication network has the same configuration except for the above description. The UEs have the same configuration except for the ON or OFF state of the LTE(D) or the ON or OFF state of the WLAN(D), and the ProSe Server 90 has the same configuration except for the Server contact list.

The ProSe Server 90 detects the communication path that can be used at the time of detecting the proximity UE. However, when the state in which the UE invalidates the direct communication path establishment function such as the OFF state of the LTE(D) or the OFF state of the WLAN(D) is received and managed, the ProSe Server determines that these communication paths are not available. The details of another UE positional information notification procedure, proximity detection unnecessary notification procedure, proximity detection procedure, communication path establishment procedure, and disconnection procedure are similarly applicable, and thus, the description thereof will be omitted.

[1.4.5 Modification Example 5]

In the first embodiment, the ProSe Server 90 notifies of the proximity detection response indicating that the LTE(D) and the WLAN(D) can be used, in the proximity detection response of S1710 or S1812. However, the ProSe Server 90 may notify the UE 10 of the proximity degree, and the UE 10 may determine to perform the direct communication depending on the proximity degree. The present modification example has a difference from the positional relationship between the UEs is expressed in numerical form and is notified and the granularity of the positional information can be minutely notified.

FIG. 24 shows an example of a UE action policy managed by the UE 10. As shown in FIG. 24, the WLAN(D) is performed in a case where the proximity degrees are 1 to 3, the LTE(D) is performed in a case where the proximity degree is 4, and it is not able to perform the direct communication in a case where the proximity degree is 5. Only one proximity degree is not notified, and multiple proximity degrees are likely to be notified. When the proximity degree of 1 and the proximity degree of 4 are notified, there is a possibility that the WLAN(D) and the LTE(D) are arbitrarily selected.

FIG. 25 shows an example of the proximity detection policy 948 managed by the ProSe Server 90. The ProSe Server 90 evaluates the UE within the Server contact list 942 based on the positional information management table 946. In FIG. 25, if the same AP name is managed in the positional relationship between the UEs, it is evaluated as being the proximity degree of 1, if the same SSID is managed, it is evaluated as being the proximity degree of 2, if the same Realm is managed, it is evaluated as being the proximity degree of 3, if the same eNB ID is managed, it is evaluated as being the proximity degree of 4, and when there is not any correspondence case, it is evaluated as being the proximity degree of 5.

FIG. 26 shows an example of the proximity detection result of S1708 or S1810 when the proximity detection method illustrated in the present example is applied. Since the UE 10 are the UE 10a are managed to be connected to the same AP and are managed to be connected to the same eNB, the UE 10a is evaluated as the proximity degree of 1 and the proximity degree of 4. Since the UE 10 and the UE 10b are managed to be connected to the same eNB, the UE 10b is evaluated as the proximity degree of 4. Since the positional information corresponding to the proximity detection policy 948 is not managed, the UEzz is evaluated as the proximity degree of 5.

The mobile communication system or the IP mobile communication network has the same configuration except for the above description. The UE has the same configuration except for the UE action policy, and the ProSe Server 90 has the same configuration except for the proximity detection policy 948.

The UE positional information notification procedure, the proximity detection unnecessary notification procedure, the proximity detection procedure, the communication path establishment procedure, and the disconnection procedure can be similarly used, and thus, the description thereof will be omitted.

[1.4.6 Modification Example 6]

Figure 27:
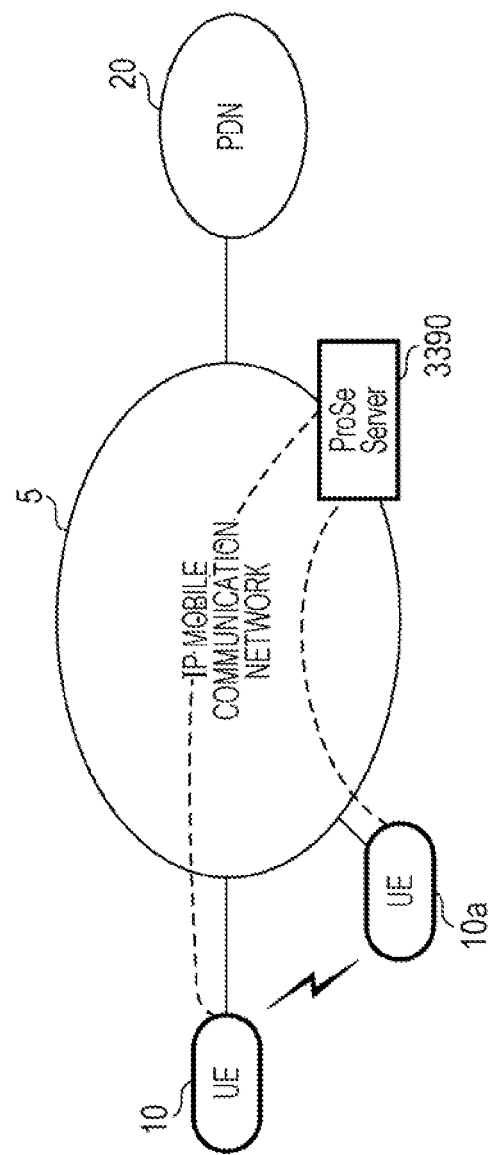
FIG. 27 is a diagram showing an example in which the ProSe Server is provided in the IP mobile communication network.

The mobile communication system may have the same configuration illustrated in FIG. 27 not the configuration illustrated in FIG. 1. It has been described in FIG. 1 that the ProSe Server 90 is provided on the PDN 20, but may be provided on the IP mobile communication network 5 as shown by a ProSe Server 3390 in FIG. 27. The ProSe Server 3390 can perform the communication by ensuring a secure communication path with the UE 10 and the UE 10a. The ProSe Server 3390 can perform the communication by ensuring a secure communication path with the MME 40.

The mobile communication system or the IP mobile communication network has the same configuration except for the above description. The UE positional information notification procedure, the proximity detection unnecessary notification procedure, the proximity detection procedure, the communication path establishment procedure, and the disconnection procedure can be similarly used, and thus, the description thereof will be omitted.

[1.4.7 Modification Example 7]

Although it has been described in the first embodiment that when the UE 10 requests the permission for the establishment of the direct communication path from the mobile communication provider, the UE 10 transmits the request including the APN and the mobile communication provider determines whether or not to permit the request based on the APN, determination means is not limited thereto, but another method may be used. For example, the MME 40 may manage an application list equivalent to the APP list 142 retained by the UE 10, may manage the application and the direct communication path capable of being established in correlation with each other, and may determine whether or not to permit the request based on the managed application list and direct communication path. In this case, the UE 10 may transmit the PDN connectivity request (S1704) or the service request (S1804) including the information regarding the application.

When the PDN connectivity request or the service request is received, the MME 40 may determine whether or not to permit the included application and the information of the direct communication path correlated with the application. Thus, the MME 40 can notify the UE 10 of whether or not to select the usable direct communication path and permit the establishment of the direct communication path for each application of the UE 10.

The configuration of each device and the procedure except for the above description are the same as those described in the first embodiment, and the detailed description thereof will be omitted.

As discussed above, although the first embodiment and the plurality of modification examples thereof have been described, the respective modification examples may be independently applied to the first embodiment, but may be applied by combining two or more modification examples.

[1.4.8 Modification Example 8]

Although the embodiments of the present invention have been described with reference to the drawings, a specific configuration is not limited to the embodiments. Designs within the scope without departing from the gist of the present invention are included in the claims.

In the respective embodiments, programs operated in the respective devices are programs (programs causing a computer to perform functions) that control a CPU and the like so as to realize the functions of the embodiments. The information used in these devices is temporarily accumulated in a temporary storage device (for example, RAM) during the process, and is then stored in a storage device such as various ROMs or HDDs. The stored information is read by the CPU when necessary, and is modified and written.

As a recording medium that stores the programs, any one of a semiconductor medium (for example, ROM, or non-volatile memory card), an optical recording medium and a magneto-optical recording medium (for example, DVD (Digital Versatile Disc), MO (Magneto Optical Disc), MD (Mini Disc), CD (Compact Disc), or BD), or a magnetic recording medium (for example, magnetic tape, or flexible disc) may be used. The functions of the present invention may be realized by performing the process in cooperation with other application programs or an operating system based on the instruction of the program, in addition to realizing the functions of the embodiments by executing the loaded program.

When the programs are distributed on the market, the programs may be distributed by being stored in a portable recording medium, or may be transmitted to a server computer connected via a network such as the Internet. In this case, a storage device of a server computer may be included in the present invention.

In the embodiments, some or all of the respective devices may be realized using LSI (Large Scale Integration) which is an integrated circuit. The respective functional blocks of the respective devices may be realized as individual chips, or some or all thereof may be realized as an integral chip. The integrated circuit is not limited to the LSI, but may be realized as a private circuit a general-purpose processor. As the semiconductor technology has progressed, when a technology for realizing the integrated circuit replaced with the LSI has appeared, it is possible to use integrated circuit realized by this technology.

Although it has been described in the embodiments that the LTE and the WLA (for example, IEEE 802.11a/b/n) are used as the example of the wireless access network, the connection may be performed through the WiMAX in place of the WLAN.

INDUSTRIAL APPLICABILITY

An embodiment of the present invention is applicable to a mobile communication system necessary to suppress unnecessary proximity discovery when a UE as a communication target is discovered in order to allow a UE that performs the transmission and reception of data in a proximity service to start the proximity service.

REFERENCE SIGNS LIST

1 Mobile communication system
5 IP mobile communication network
10 UE
20 PDN
30 PGW
35 SGW
40 MME
45 eNB
50 HSS
55 AAA
60 PCRF
65 ePDG
70 WLAN ANa
72 WLAN APa
74 GW
75 WLAN ANb
76 WLAN APb
80 LTE AN
90 ProSe Server

The invention claimed is:

1. A User Equipment (UE) comprising:
a controller; and
transmitting and receiving circuitry configured to:
    transmit, to a core network, a request message for requesting authorization of establishment of a direct communication path between the UE and a proximity UE; and
    receive, in response to the request message, from the core network, first information indicating that the establishment of the direct communication path has been authorized, wherein
the proximity UE is positioned in proximity to the UE,
the first information includes at least an IP address and frequency information,
the IP address and the frequency information are used by the UE to perform direct communication with the proximity UE,
after the first information is received, the controller is configured to initiate a discovery procedure for the proximity UE,
after the discovery procedure is completed, the transmitting and receiving circuitry is configured to perform direct communication with the proximity UE using the established direct communication path, and
a destination of the request message is the core network.

2. A core network device comprising:
transmitting and receiving circuitry configured to:
    receive, from a User Equipment (UE), a request message for requesting authorization of establishment of a direct communication path between the UE and a proximity UE; and
    transmit, to the UE, in response to the request message, first information indicating that the establishment of the direct communication path has been authorized, wherein
the proximity UE is positioned in proximity to the UE,
the first information includes at least an IP address and frequency information,
the IP address and the frequency information are used by the UE to perform direct communication with the proximity UE,
the first information is used by the UE to initiate a discovery procedure for the proximity UE, and
a destination of the request message is the core network device.

3. A communication method performed by a User Equipment (UE), the communication method comprising:

transmitting, to a core network, a request message for requesting authorization of establishment of a direct communication path between the UE and a proximity UE; and receiving, in response to the request message, from the core network, first information indicating that the establishment of the direct communication path has been authorized, wherein the proximity UE is positioned in proximity to the UE, the first information includes at least an IP address and frequency information, the IP address and the frequency information are used by the UE to perform direct communication with the proximity UE, after the first information is received, the UE initiates a discovery procedure for the proximity UE, after the discovery procedure is completed, the UE performs direct communication with the proximity UE using the established direct communication path, and a destination of the request message is the core network.

4. A communication method performed by a core network device, the communication method comprising:

receiving, from a User Equipment (UE), a request message for requesting authorization of establishment of a direct communication path between the UE and a proximity UE; and transmitting, to the UE, in response to the request message, first information indicating that the establishment of the direct communication path has been authorized, wherein the proximity UE is positioned in proximity to the UE, the first information includes at least an IP address and frequency information, the IP address and the frequency information are used by the UE to perform direct communication with the proximity UE, the first information is used by the UE to initiate a discovery procedure for the proximity UE, and a destination of the request message is the core network device.

\* \* \* \* \*